(12) United States Patent
Ge et al.

(10) Patent No.: US 9,494,813 B2
(45) Date of Patent: *Nov. 15, 2016

(54) MULTI-PURPOSE DISPLAY SYSTEM

(71) Applicant: Tronxyz Technology Co., Ltd., Shenzhen (CN)

(72) Inventors: Zhang Ge, Shenzhen (CN); Lei Song, Shenzhen (CN); Rui Wang, Shenzhen (CN)

(73) Assignee: TRONXYZ TECHNOLOGY CO., LTD., Shenzhen (CN)

( * ) Notice: Subject to any disclaimer, the term of this patent is extended or adjusted under 35 U.S.C. 154(b) by 149 days.

This patent is subject to a terminal disclaimer.

(21) Appl. No.: 14/448,563

(22) Filed: Jul. 31, 2014

(65) Prior Publication Data

US 2015/0268508 A1  Sep. 24, 2015

(30) Foreign Application Priority Data

Mar. 20, 2014  (CN) .......................... 2014 1 0105687
Mar. 20, 2014  (CN) .......................... 2014 1 0105747
Mar. 20, 2014  (CN) .......................... 2014 1 0106492

(51) Int. Cl.
*G09G 5/14* (2006.01)
*G02F 1/1333* (2006.01)
*G06F 3/147* (2006.01)

(52) U.S. Cl.
CPC ......... *G02F 1/133308* (2013.01); *G06F 3/147* (2013.01); *G09G 2320/08* (2013.01); *G09G 2360/144* (2013.01); *G09G 2380/06* (2013.01)

(58) Field of Classification Search
CPC ...................................................... G06F 3/147
USPC ........................................... 345/633; 235/375
See application file for complete search history.

(56) References Cited

U.S. PATENT DOCUMENTS

| 4,988,976 | A |   | 1/1991  | Lu |
| 5,880,443 | A | * | 3/1999  | McDonald ............. B65G 1/045 198/347.2 |
| 6,481,851 | B1 | * | 11/2002 | McNelley .......... G02B 27/2292 345/5 |

(Continued)

FOREIGN PATENT DOCUMENTS

CN  1570703 A  1/2005
CN  100429559 C  10/2008

(Continued)

*Primary Examiner* — Javid A Amini
(74) *Attorney, Agent, or Firm* — Anova Law Group, PLLC

(57) ABSTRACT

An electronic packaging box includes a receiving structure, a transmissive/reflective component, and a support structure. The receiving structure is configured to receive an electronic display device having a display screen for displaying an image by the electronic display device. The transmissive/reflective component is spatially coupled to the receiving structure such that, when the electronic display device is placed into the receiving structure, the display screen of the electronic display device faces the transmissive/reflective component. The support structure is configured to support the receiving structure and the transmissive/reflective component. Further, the transmissive/reflective component is configured to form a virtual image of the image displayed by the electronic display device placed in the receiving structure when viewed by a viewer at a viewing angle.

21 Claims, 19 Drawing Sheets

(56) References Cited

U.S. PATENT DOCUMENTS

| | | | | |
|---|---|---|---|---|
| 6,883,711 B2* | 4/2005 | Patton | ................... | B21C 51/00 |
| | | | | 235/375 |
| 7,104,453 B1* | 9/2006 | Zhu | ....................... | B82Y 15/00 |
| | | | | 235/375 |
| 8,317,084 B2* | 11/2012 | Bagai | .................. | B65D 5/4216 |
| | | | | 235/375 |
| 2006/0011504 A1* | 1/2006 | Gosebruch | ............ | G06K 17/00 |
| | | | | 206/459.5 |
| 2010/0179914 A1* | 7/2010 | Levin | ..................... | G06K 19/14 |
| | | | | 705/318 |
| 2011/0108618 A1* | 5/2011 | Cowburn | .......... | G06K 7/10762 |
| | | | | 235/375 |
| 2011/0155798 A1* | 6/2011 | Pinchen | ................. | B41F 9/003 |
| | | | | 235/375 |
| 2012/0175412 A1* | 7/2012 | Grabiner | ........... | G06Q 30/0623 |
| | | | | 235/375 |
| 2012/0181330 A1* | 7/2012 | Kim | ....................... | G06Q 30/02 |
| | | | | 235/375 |
| 2015/0268748 A1* | 9/2015 | Ge | ......................... | G06F 3/041 |
| | | | | 345/173 |
| 2015/0269880 A1* | 9/2015 | Ge | ....................... | G09G 3/2003 |
| | | | | 345/690 |

FOREIGN PATENT DOCUMENTS

| | | |
|---|---|---|
| CN | 103863660 A | 6/2014 |
| CN | 103863713 A | 6/2014 |
| JP | S6021715 U | 2/1985 |
| JP | 2013076716 A | 4/2013 |

* cited by examiner

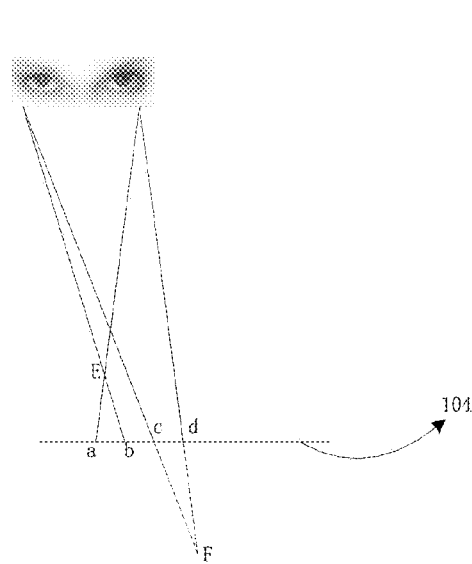
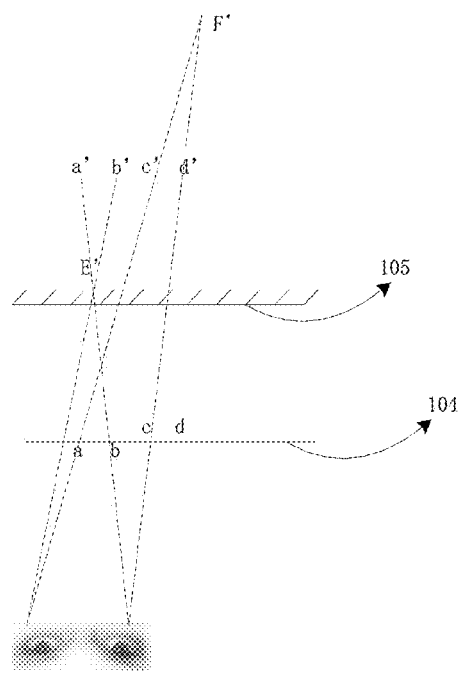
FIG. 24a FIG. 24b
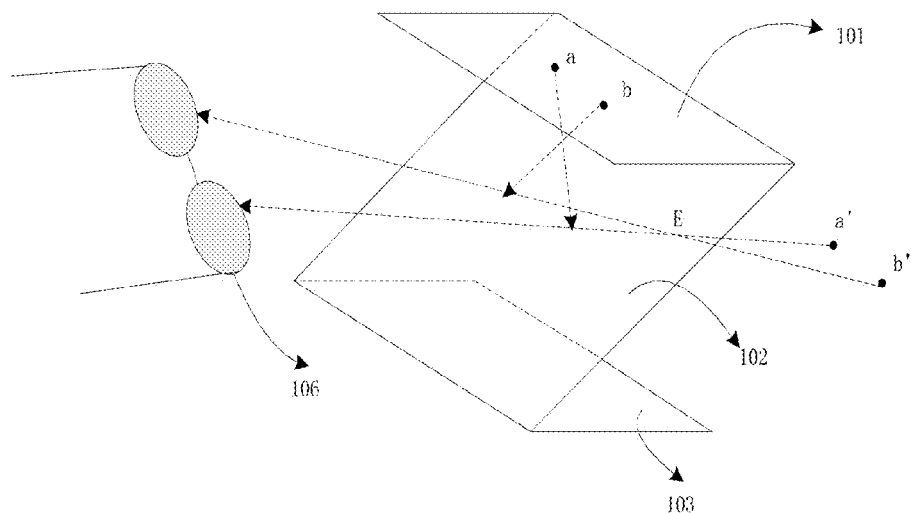
FIG. 25

MULTI-PURPOSE DISPLAY SYSTEM

CROSS-REFERENCES TO RELATED APPLICATIONS

This application claims priority of Chinese Patent Application Numbers CN201410105687.5, CN201410105747.3, and CN201410106492.2, all filed on Mar. 20, 2014, the entire contents of all of which are incorporated by reference herein.

FIELD OF THE INVENTION

The present invention generally relates to the field of display technology and, more particularly, to a multi-purpose display device using electronically displayed images to enhance other non-display functionalities.

BACKGROUND

Under current display technologies, whether two-dimensional (2D) display technologies or three-dimensional (3D) display technologies, viewers typically view images directly displayed on electronic display devices. The images of such display are necessarily limited by the screen frames of the electronic display devices and, particularly images of 3D display, can cause a sense of oppression, severely reducing the 3D visual experience. For example, when displaying a 3D road surface extends toward the front of the display screen, and the display images are limited by the screen frames, the viewer may have a visual experience that the road surface is broken and cannot be extended forwardly. A visual sense of vertigo may be caused, severely affecting the 3D image viewing experience.

In addition, currently, most packaging boxes for mobile phones, iPads, and other electronic devices are packaging cartons, which are discarded after the electronic devices are removed from the packaging boxes. Some electronic packaging boxes have been developed. For example, U.S. Pat. No. 8,317,084 discloses a packaging box containing a wireless communication unit. The wireless communication unit can receive identification information of the object inside the packaging box sent by a data transmitter. The packaging box also includes a display and a processor. The processor collects the received identification information and to cause the display to display of the identification information of the object inside the packaging box. The display, the processor, and the communication unit are integrated in the packaging box.

However, such packaging box only uses indication to identify the object in the packaging box to achieve the recognition of the content of the packaging box. The purpose for such recognition is to display identification information of the object inside the packaging box, in order to facilitate obtaining information about change or missing of the object in the packaging box. Further, such packaging box only displays related information about the content of the packaging box to achieve counting without opening. For users of the electronic devices, once the electronic devices are removed out of the packaging box, the packaging box would have no value. Often such addition of the display functionalities of recording and counting missing and change to the packaging box can increase the cost of the packaging box, and such cost can be passed on to consumers. The consumers may pay the cost but do not get the corresponding usage value in return. Finally, as the consumers often discard this type of packaging boxes, while the packaging boxes contain electronic components such as processors and displays, generating wastes and polluting the environment.

The disclosed method and device are directed to solve one or more problems set forth above and other problems.

BRIEF SUMMARY OF THE DISCLOSURE

One aspect of the present disclosure includes an electronic packaging box. The electronic packaging box includes a receiving structure, a transmissive/reflective component, and a support structure. The receiving structure is configured to receive an electronic display device having a display screen for displaying an image by the electronic display device. The transmissive/reflective component is spatially coupled to the receiving structure such that, when the electronic display device is placed on the receiving structure, the display screen of the electronic display device faces the transmissive/reflective component. The support structure is configured to support the receiving structure and the transmissive/reflective component. Further, the transmissive/reflective component is configured to form a virtual image of the image displayed by the electronic display device placed in the receiving structure when viewed by a viewer at a viewing angle.

Another aspect of the present disclosure includes a display apparatus. The display apparatus includes a first support structure, a transmissive/reflective device, and a second support structure. The first support structure is arranged to receive an electronic display device having a display screen for displaying an image by the electronic display device. The transmissive/reflective device is coupled to the first support structure such that, when the electronic display device is placed on the first support structure, the display screen of the electronic display device faces the transmissive/reflective device. Further, the second support structure is configured to support the first support structure and the transmissive/reflective device. The transmissive/reflective device is configured to generate a virtual image of the image displayed by the electronic display device positioned on the first support structure after light of the image passing through the first support structure and being projected onto the transmissive/reflective device when viewed by a viewer at a viewing angle.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are briefly described below, which are merely some exemplary embodiments of the present invention. For those skilled in the art, without inventive effort, other drawings may also be obtained according to these drawings and the descriptions included herein.

FIG. 24a illustrates an imaging process of a conventional autostereoscopic display apparatus;

FIG. 24b illustrates an imaging process of the disclosed display system for autostereoscopic display consistent with disclosed embodiments;

FIG. 25 illustrates an imaging process of the display system using 3D glasses consistent with disclosed embodiments;

DETAILED DESCRIPTION

Figure 1:
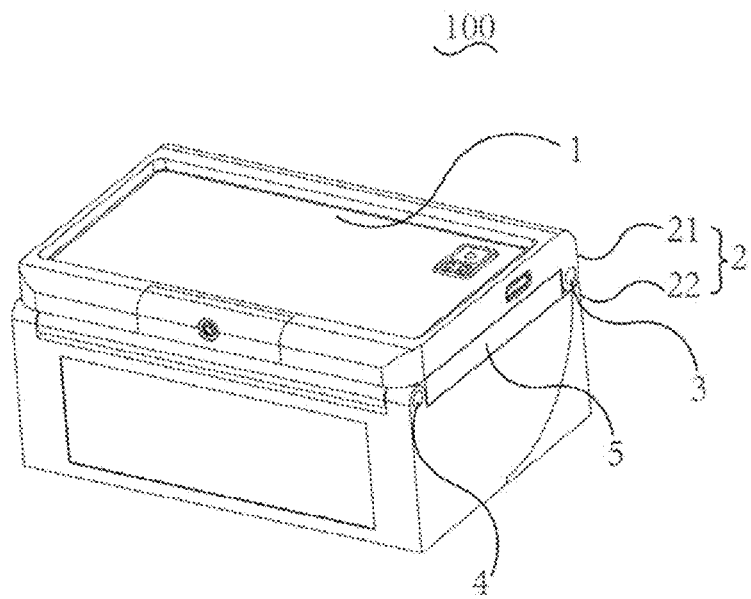
FIGS. 1-5 illustrate an exemplary display system consistent with the disclosed embodiments.

Reference will now be made in detail to exemplary embodiments of the invention, which are illustrated in the accompanying drawings.

FIGS. 1-4 illustrate an exemplary display system consistent with the disclosed embodiments. As shown in FIGS. 1-4, a display system 100 may include an electronic display device 1 and a packaging box (not labeled). The electronic display device 1 may include any appropriate electronic device having certain display functions, such as mobile phone, smart phone, tablet computer, digital book reader, notebook computer, and any other type of device.

The electronic display device 1 may have a display surface (not shown). The packaging box includes a packaging body 2, a first connecting structure 3, a moveable connecting structure 4, and a transmissive/reflective component 5. Further, the packaging body 2 may include a receiving structure 21 and a support structure 22. The receiving structure 21 is used for accommodating or receiving the electronic display device 1. The packaging box is configured to pack the electronic display device 1 and its accessories/parts, with certain special display functionalities.

Figure 2:
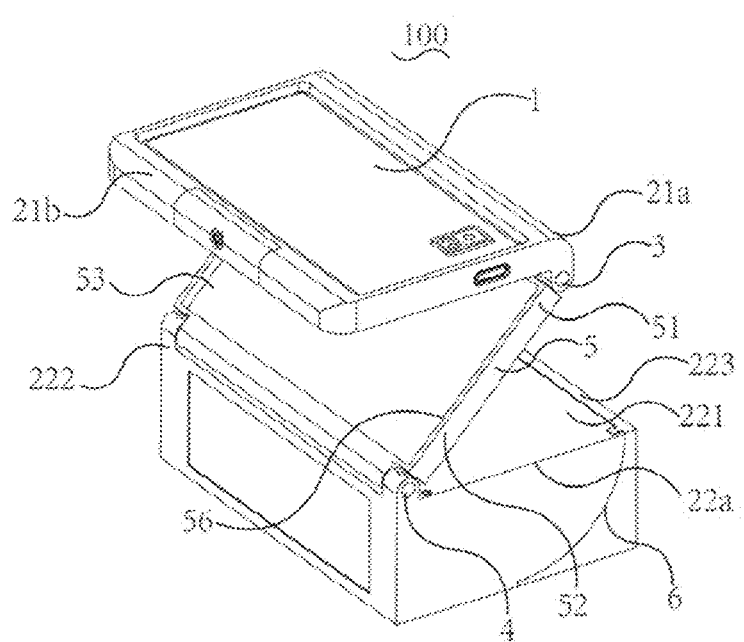

FIG. 2 illustrates an exemplary display device in an extended position. As shown in FIG. 2, the receiving structure 21 may include a connecting end 21a and a free end 21b opposite to the connecting end 21a. The transmissive/reflective component 5 may include a first end 51 and a second end 52 opposite to the first end 51, and the transmissive/reflective component 5 also includes a first surface 53 and a second surface 54 opposite to the first surface 53. The first surface 53 faces the receiving structure 21, and the second face 54 faces the support structure 22.

The first end 51 of the transmissive/reflective component 5 is coupled to the connecting end 21a of the receiving structure 21 through the connecting structure 3. The second end 52 of the transmissive/reflective component 5 is moveably coupled to the support structure 22 through the moveable connecting structure 4. When the display system 100 is opened (e.g., extended), a virtual image of the image displayed by the electronic display device 1 can be formed on the side of the second surface 54 of the transmissive/reflective component 5.

Figure 4:
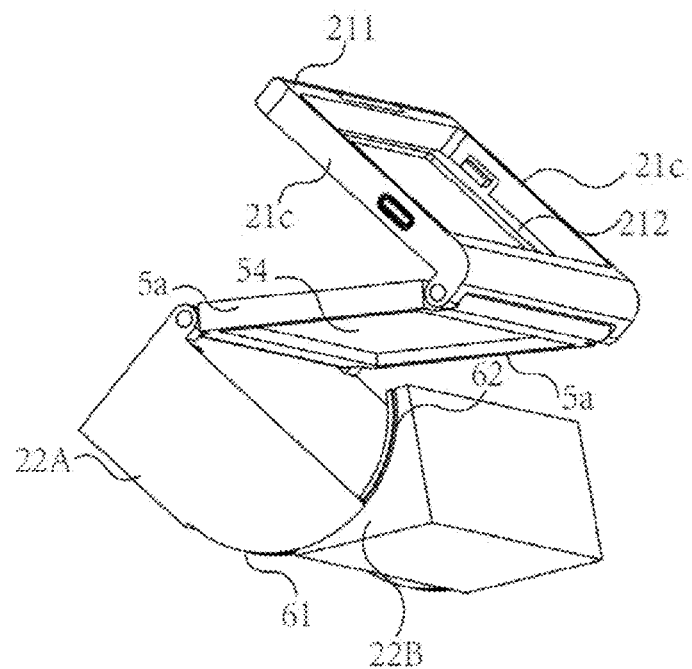

As shown in FIG. 4, the receiving structure 21 includes a hollow frame 211, and the frame 211 form a receiving space 212 for housing the electronic display device 1. The receiving space 212 matches the electronic display device 1.

The free end 21b of the receiving structure 21 has an opening (not labeled) for placing the electronic display device into the receiving space 212 through the opening. The shapes and structures of the receiving structure 21 are not limited, as long as the receiving structure 21 can accommodate the electronic display device 1 and expose the display surface 11 of the electronic display device 1, facing the transmissive/reflective component 5, such that the light of the displayed image on the electronic display device 1 can pass through the transmissive/reflective component 5 to form a virtual image on the side of the second surface 54 of the transmissive/reflective component 5.

The support structure 22 can be a hollow rectangular box body, and the support structure 22 may be used to contain other parts or accessories of the display system 100 and/or the electronic display device 1, such as such as manuals, ear plugs, and USB cables, etc. The support structure 22 may include a connecting plane 221, a connecting end 222, and a free end 223 opposite of the connecting end 222.

The connecting plane 221 is disposed between the connecting end 222 and the free end 223. The second surface 54 of the transmissive/reflective component 5 faces the connecting plane 221. Further, the free end 21b of the receiving structure 21 and the connecting end 222 of the support structure 22 are on the same side, and the connecting end 21a of the receiving structure 21 and the free end 223 of the support structure 22 are on the same side. The receiving structure 21 can be parallel to the support structure 22.

Further, the receiving structure 21 also includes two first edges 21c connecting the free end 21b of the receiving structure 21 and the connecting end 21a of the receiving structure 21. The transmissive/reflective component 5 also includes two second edges 5a connecting the first connecting end 51 and the second connecting end 52. The length of the first edges 21c of the receiving structure 21 is approximately the same as the length of the second edges 5a of the transmissive/reflective component 5. The support structure 22 also includes two third edges 22a connecting the free end 223 and the connecting end 221 of the support structure 22, and the length of the third edges 22a is approximately the same as the length of the first edges 21c of the receiving structure 21. Thus, when the receiving structure 21 is folded and covers the support structure 22, the package body 2 forms a box structure in the shape of a cube or a rectangular prism.

Figure 3:
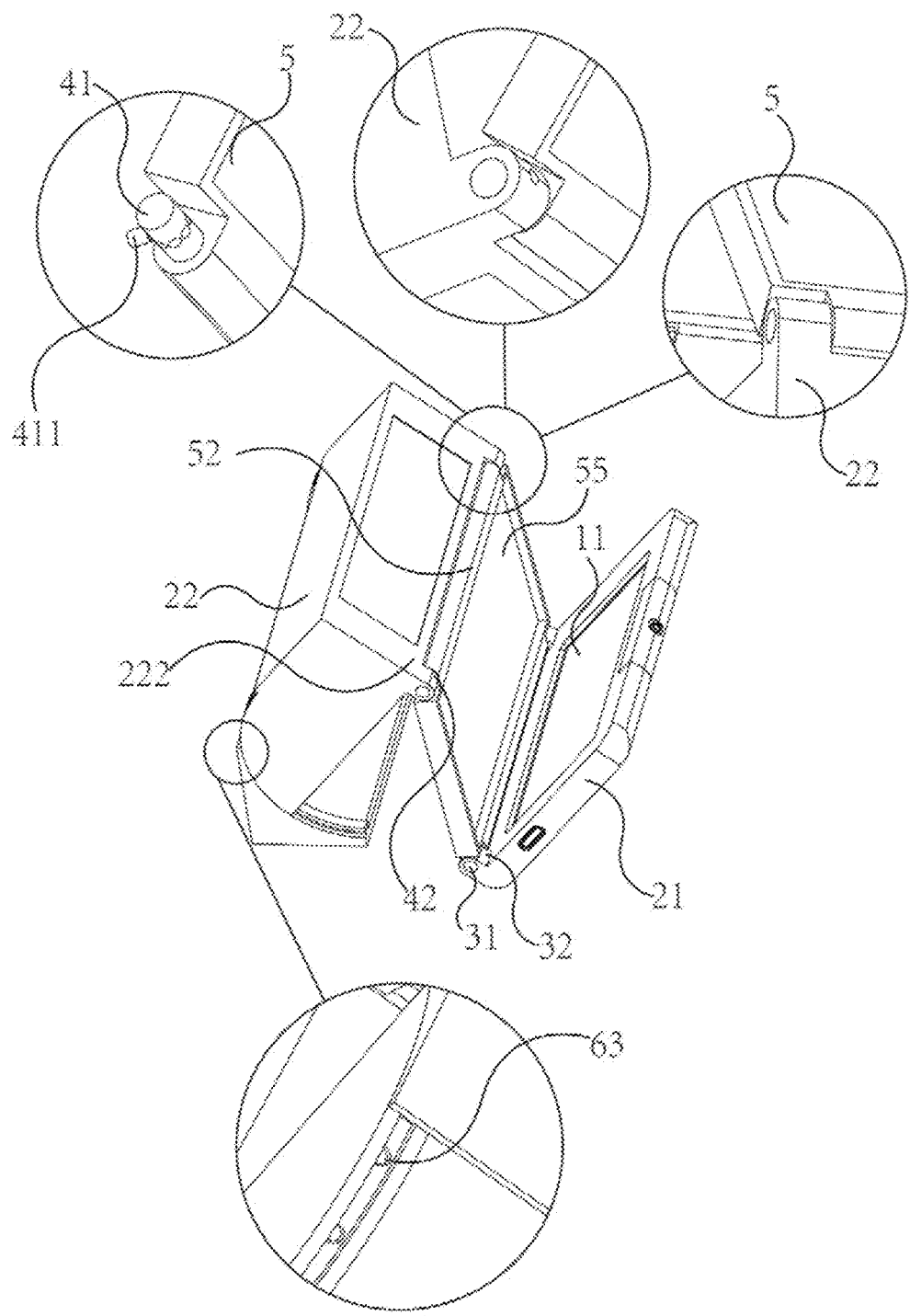

The second end 52 of the transmissive/reflective component 5 is moveably coupled to the connecting end 222 of the support structure 22 through the moveable connecting structure 4. As shown in FIG. 3, the moveable connecting structure 4 can include a positioning shaft 41 on the side of the second end 52 of the transmissive/reflective component 5 and a positioning sleeve 42 on the connecting end 222 of the support structure 22. The positioning shaft 41 has a positioning protrusion 411, and a corresponding positioning groove (not shown) is located on the inner side of the positioning sleeve 42. The positioning shaft 41 can be inserted into the positioning sleeve 42, with the positioning protrusion 411 engaged in the positioning groove.

Alternatively, the positioning shaft 41 may be disposed on the support structure, and the corresponding positioning sleeve 42 may be disposed on the second end 52 of the transmissive/reflective component 5. Also, the positioning protrusion may be located on the positioning sleeve and the corresponding positioning groove may be located on the positioning shaft. Other structures may also be used for the moveable connecting structure, including other rotary positioning structures, such hinge structures.

The first connecting structure 3 may be a moveable connecting structure. The first connecting structure 3 may have a similar structure to the moveable connecting structure 4, and can be disposed between the first end 51 of the transmissive/reflective component 5 and the connecting end 21a of the receiving structure 21. In certain embodiments, the first connecting structure 3 may have a different structure from the moveable connecting structure 4. Further, the first connecting structure 3 may have other rotary positioning structures, such hinge structures.

The transmissive/reflective component 5 may include a transmissive/reflective device 55 and a fixing member 56 for fixing the transmissive/reflective device 55. In certain embodiments, the fixing member 56 is a fixing member made of a transparent material.

The transmissive/reflective device 55 is a device that has a surface coating and whose transmissive/reflecting ratio can be adjusted according to the ambient light. With a power supply, the transmissive/reflective device 55 can also be a liquid crystal glass device (also known as electronically-controlled liquid crystal glass). When power is applied, the transmissive rate can be adjusted by adjusting the voltage of the device to adapt to changing light environment.

In operation, the electronic display device 1 is initially packed inside the receiving structure 21, and the display system 100 and the electronic display device 1 are in a non-display state. The followings describe in detail on how the display device changes from a non-display state to a display state.

When an external force is being applied on the receiving structure 21, the receiving structure 21 can bring the transmissive/reflective component 5 in motion. That is, the transmissive/reflective component 5 may rotate with respect to the receiving structure 21 through the first connecting structure 3, and the transmissive/reflective component 5 can also rotate with respect to the support structure 22 through the moveable connecting structure 4. Thus, a space can be formed between the receiving structure 21 and the first surface 53 of the transmissive/reflective component 5, and a space is also formed between the support structure 22 and the second surface 54 of the transmissive/reflective component 5.

When the display screen 11 of the electronic display device 1 contained in the receiving structure 21 forms a 45-degree angle with respect to the first surface 53 of the transmissive/reflective component 5, and the second surface 54 of the transmissive/reflective component 5 forms a 45-degree angle with respect to the surface 221 of the support structure 22, the generated virtual image on the side of the second surface 54 may be the same size as the image displayed on the electronic display device 1. In certain embodiments, when in the display state (as in FIG. 2), the receiving structure 21 is parallel to the support structure 22, and the transmissive/reflective component 5 forms two respective acute angles with the receiving structure 21 and the support structure 22. Thus, when in the display state, the display device is in a normal "Z" shape or a normal approximate "Z" shape.

When a viewer views the display device, the receiving structure 21 is in front of the support structure 22. Thus, the viewer's visual experience on the virtual image is not limited by the electronic display device 1, such as undesired display screen image with respect to the environment.

Further, the receiving structure 21 and the support structure 22 are in relatively regular cubic shapes, and the "Z" shaped structure makes the display device more stable and with a desired appearance. Obviously, when the transmissive/reflective component 5 connects to the receiving structure 21 and the support structure 22 from another symmetrical direction, the display device can be in a reverse "Z" shape or a reverse approximate "Z" shape. Similarly, when the packaging box is opened, it can be in a reverse "Z" shape or a reverse approximate "Z" shape.

Further, the display system 100 can also include a viewing angle adjusting mechanism 6. The viewing angle adjusting mechanism 6 may be disposed on the support structure 22. The support structure 22 may include a first portion 22A and a second portion 22B, and the first portion 22A and the second portion 22B are coupled together to form a box body. The connecting end 222 of the support structure 22 and the connecting plane 221 are disposed on the first portion 22A, and the second surface 54 of the transmissive/reflective component 5 forms an acute angle with the connecting plane 221 on the first portion 22a of the support structure 22.

In certain embodiments, the viewing angle adjusting mechanism 6 is disposed on the mating surface of the first portion 22A and the second portion 22B. The viewing angle adjusting mechanism 6 includes, on each side, a slider 61 disposed on the first portion 22A, a corresponding groove matching the slider disposed on the second portion 22B, and a positioning structure 63. The positioning mechanism 63 may include a positioning steel ball (not labeled) and an elastic member (not shown) fixing the positioning steel ball on the bottom of the groove 62. In certain embodiments, the elastic member is a spring.

Thus, the viewing angle of the display system 100 can be adjusted through adjusting the viewing angle adjusting mechanism 6. More specifically, by maneuvering the first portion 22A or the second portion 22B of the supporting structure 22, the first portion 22A can slide a certain distance along the groove 62 with respect to the second portion 22B, thereby changing the viewing angle. Of course, other structures can also be used for the viewing angle adjusting mechanism 6. For example, the viewing angle adjustment mechanism may be a moveable adjusting structure moveably connected to the bottom of the support structure, such that the moveable adjusting structure can be maneuvered to cause the support structure 22, the transmissive/reflective component 5, and the receiving structure 21 to rotate with respect to the viewing angle adjustment mechanism 6, while keeping the relative positions among the support structure 22, the transmissive/reflective component 5, and the receiving structure 21 fixed. Thus, the viewing angle can be adjusted without affecting the virtual image's imaging space.

Figure 5:
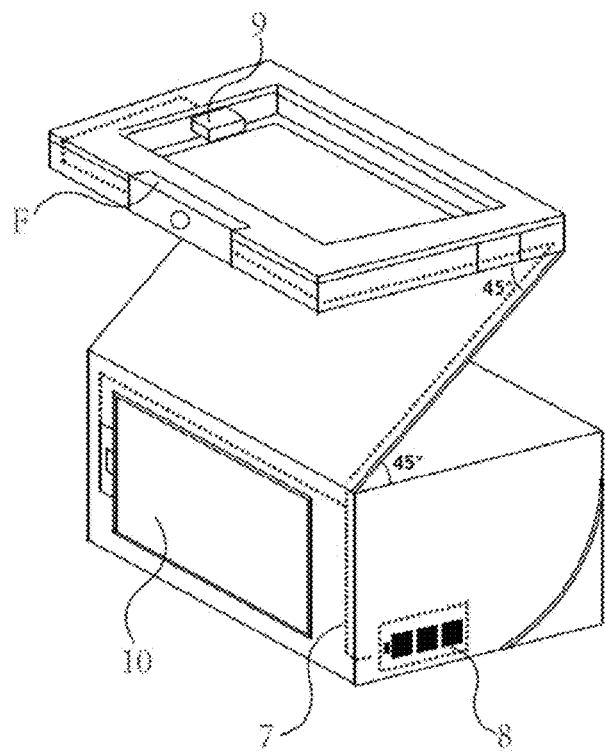
Figure 6:
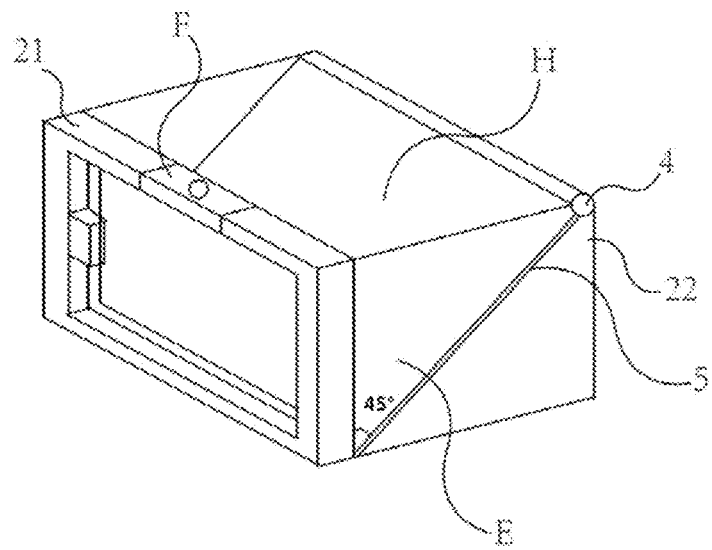
FIGS. 6-9 illustrate another exemplary display system consistent with the disclosed embodiments.
Figure 7:
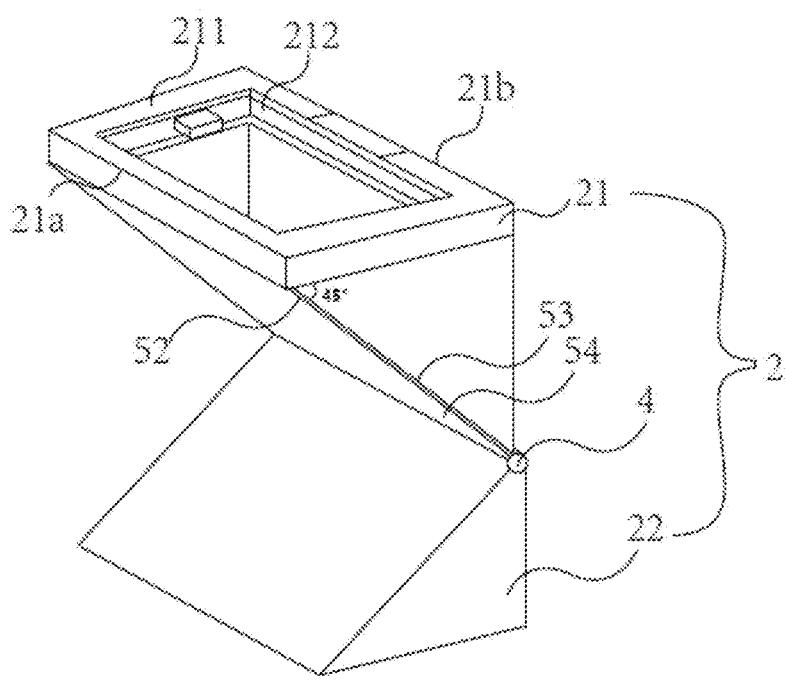
Figure 8:
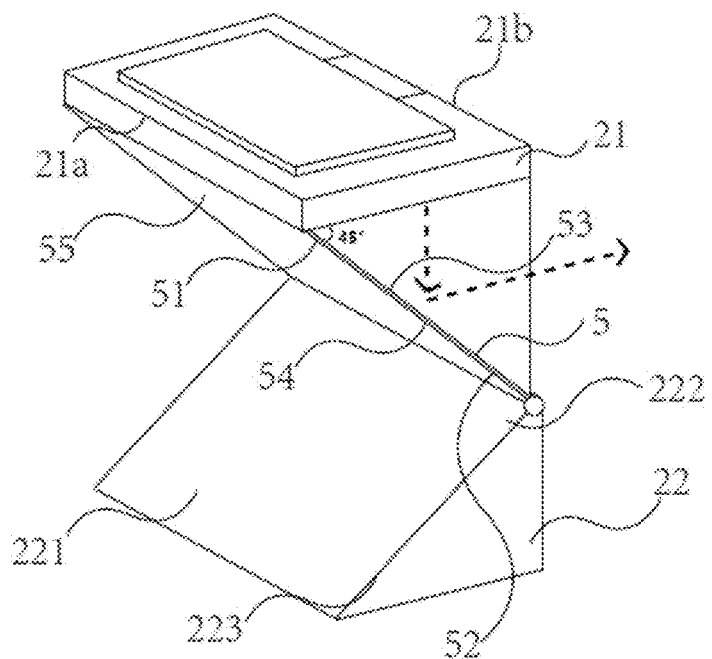
Figure 9:
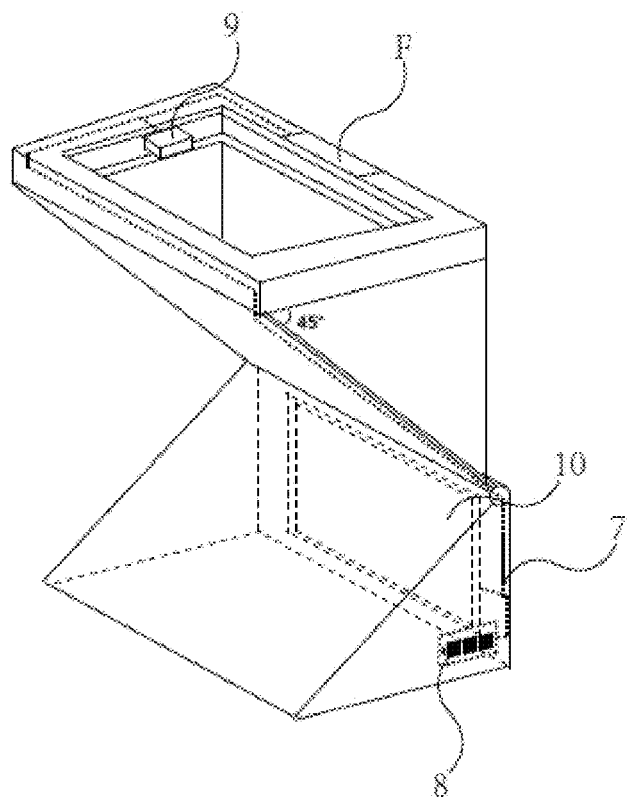
Figure 10:
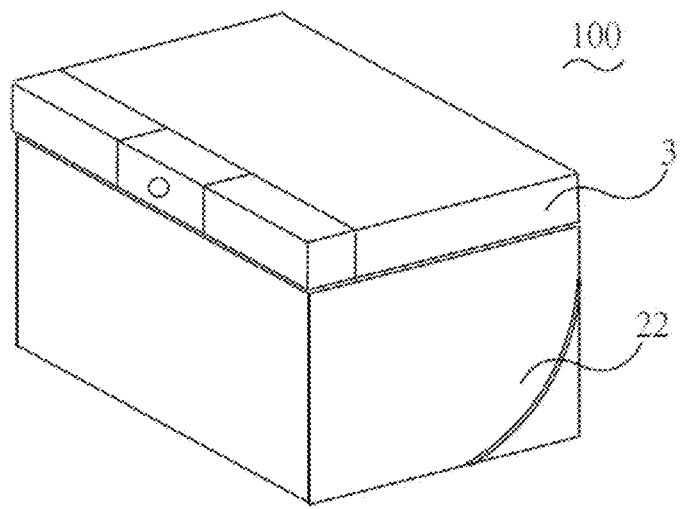
FIGS. 10-13 illustrate another exemplary display system consistent with the disclosed embodiments.
Figure 11:
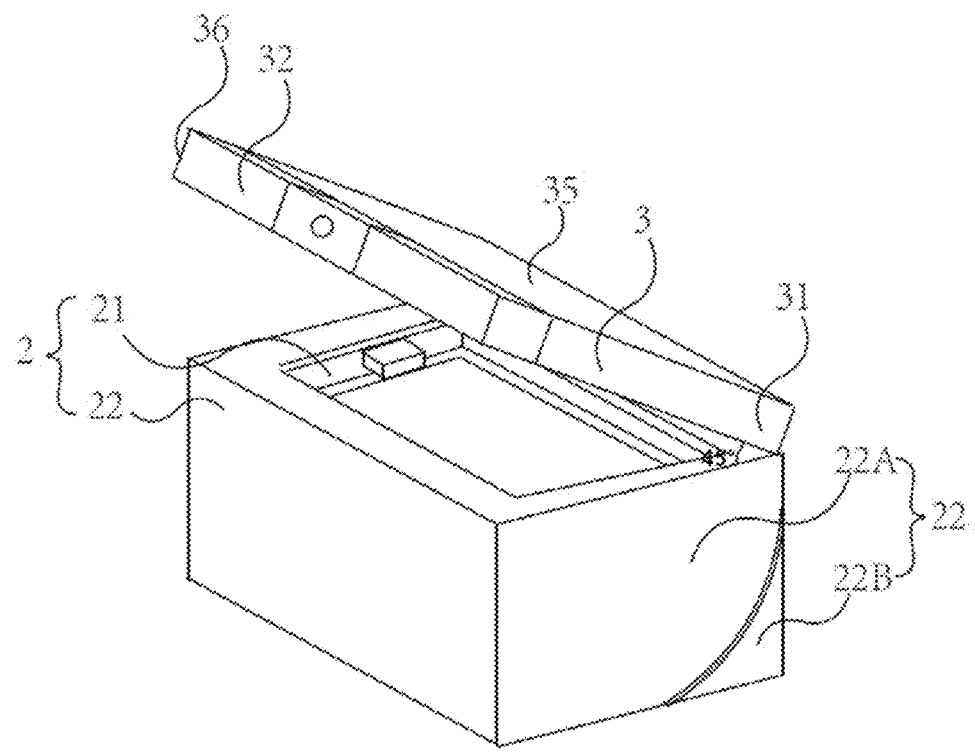
Figure 12:
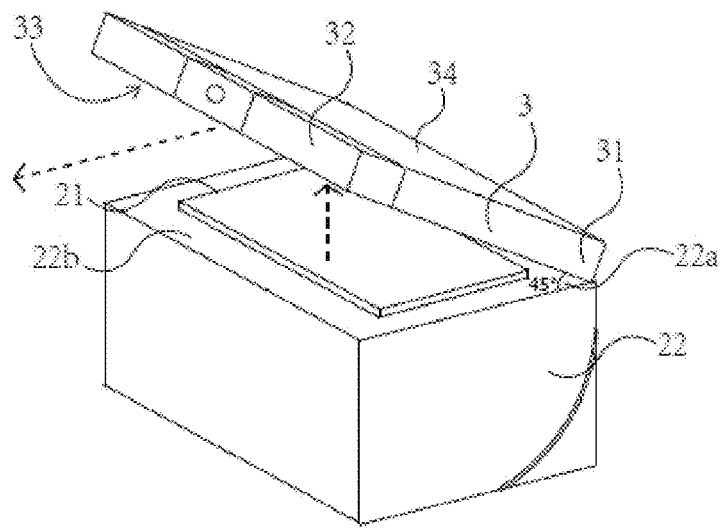
Figure 13:
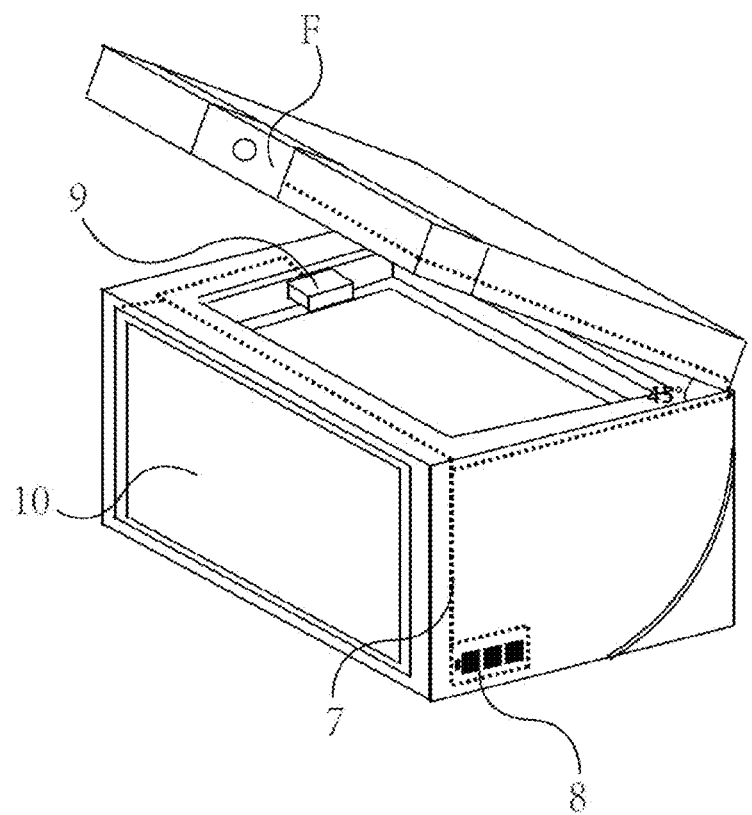
Figure 14:
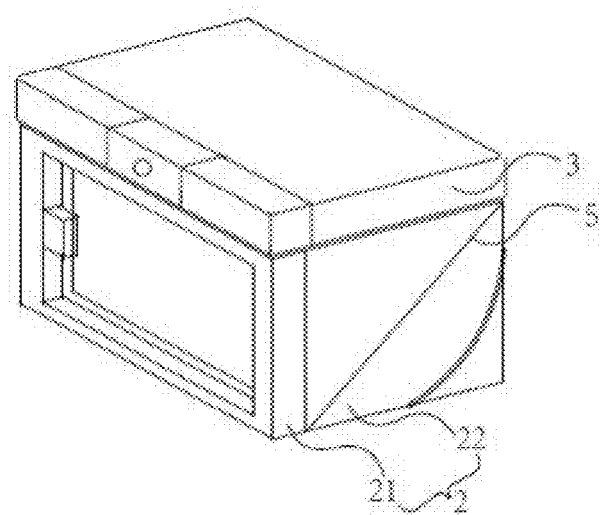
FIGS. 14-17 illustrate another exemplary display system consistent with the disclosed embodiments.
Figure 15:
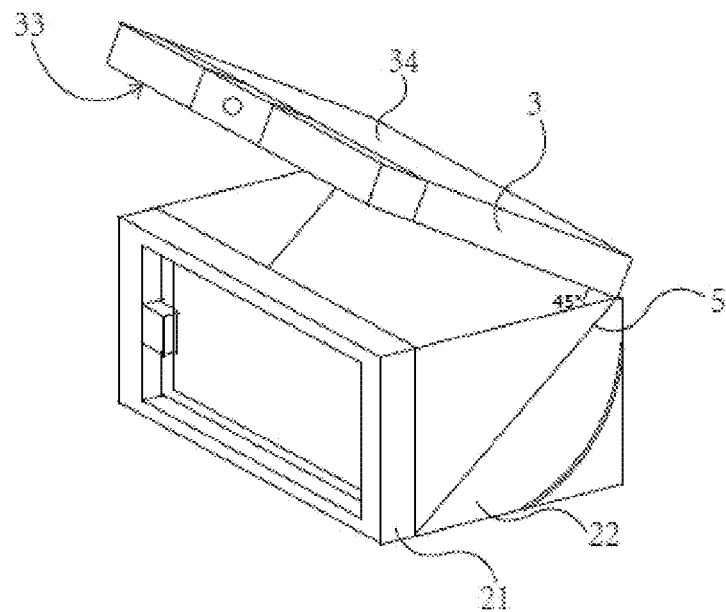
Figure 16:
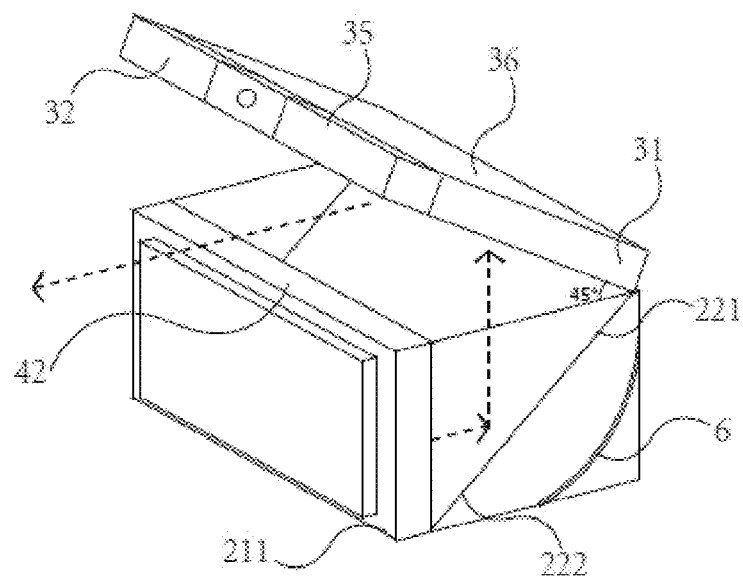
Figure 17:
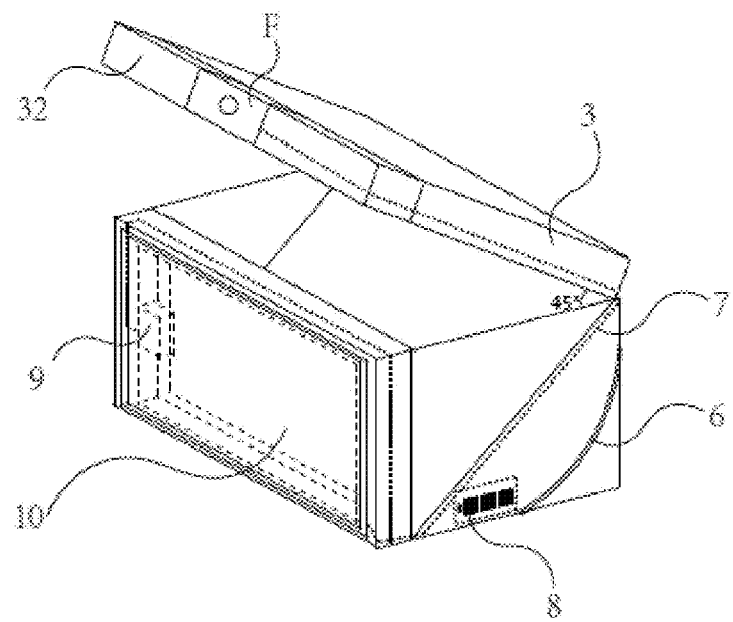

Further, as shown in FIG. 5, the display system 100 may also include additional function units. The additional function units may include a circuit connecting unit 7, a power supply unit 8, and a communication interface unit 9, etc.

The circuit connecting unit 7 may include a pressing circuit switch (not shown) and connection wires (not labeled), and the pressing circuit switch may be disposed on the moveable connecting structure 4 and/or the first connecting structure 3. The power supply unit 8 is coupled to the communication interface unit 9 through the circuit connecting unit 7, such that power can be applied to the electronic display device 1 when needed. When the receiving structure 21 forms a predetermined angle with the first surface 53 of the transmissive/reflective component 5, and/or second surface 54 of the transmissive/reflective component 5 forms a predetermined angle with the connecting plane 221 of the support structure 22, the pressing circuit switch is turned on, and the communication interface unit 9 and the power supply unit 8 are connected. In certain embodiments, the communication module 9 is a USB interface unit or other communication unit, such as a Bluetooth unit.

Further, the display system 100 may include a control member 10 disposed on the support structure 22. The control member 10 may be a touch control structure, including a control circuit unit (not shown) and a display screen (not labeled). The touch control structure is electrically coupled to the power supply unit 8 and the USB interface unit through the circuit connecting unit 7. The touch control structure may be rotatably embedded onto the surface of the support structure 22 through a moveable connecting structure (not labeled), such that the display screen of touch control structure face outside when the touch control structure rotates 180 degrees and, when the touch control structure rotates another 180 degrees, the display screen faces inside and supports internal structures, protecting the display screen from being damaged. Alternatively, the moveable connecting structure may be omitted, and the touch control structure is directed embedded onto the surface of the support structure. The surface of the display screen of the touch control structure may be lower than the surface of the support structure such that the display screen may be protected. In addition, the control structure may also be a key-pressing control structure having one or more keys. The circuit connecting unit can set certain functional circuit units corresponding to the key pressing of the key-pressing control structure to achieve appropriate function control.

Further, as shown in FIG. 5, the additional functional units of the display system 100 may also include a camera unit F. The camera unit F may be disposed on the free end 21b of the receiving structure 21. The camera unit F may be coupled to the USB interface unit and the electronic display device 1 through the circuit connecting unit 7, and also coupled to the power supply unit 8 through the circuit connecting unit 7. Thus, the camera unit F can capture an image and send the captured image to the electronic display device 1, and the electronic display device 1 can then display the image, with the corresponding virtual image formed on the side of the second surface 54 of the transmissive/reflective component 5.

The electronic display device 1 may further include an image processing unit. The camera unit F can capture the image information of human face or human eyes of the viewer and send the information to the electronic display device 1, and the image processing unit of the electronic display device can accordingly adjust the viewing angle of the image displayed on the electronic display device. The image on the electronic display device can be automatically changed with the change of the viewing angle.

FIGS. 6-9 illustrate another exemplary display system consistent with the disclosed embodiments. As shown in FIGS. 6-9, the display system 100 may include an electronic display device 1 and a packaging box (not labeled). The electronic display device 1 may have a display surface (not shown). The packaging box includes packaging body 2, a first connecting structure (not shown), a moveable connecting structure 4, and a transmissive/reflective component 5.

The packaging body 2 may include receiving structure 21 and the support structure 22. The receiving structure 21 is configured to house the electronic display device 1 and may include a connecting end 21a and a free end 21b opposite to the connecting end 21a. The transmissive/reflective component 5 may include a first end 51 and a second end 52 opposite to the first end 51, and the transmissive/reflective component 5 also includes a first surface 53 and a second surface 54 opposite to the first surface 53. The first surface 53 faces the receiving structure 21, and the second face 54 faces the support structure 22.

The first end 51 of the transmissive/reflective component 5 is coupled to the connecting end 21a of the receiving structure 21 through the first connecting structure. The second end 52 of the transmissive/reflective component 5 is moveably coupled to the support structure 22 through the moveable connecting structure 4. When the display system 100 is in a display state, a virtual image can be displayed by the electronic display device 1 on the side of the second surface 54 of the transmissive/reflective component 5.

The receiving structure 21 is in a cubic shape and includes a hollow frame 211. The frame 211 forms a receiving space 212 for housing the electronic display device 1. The receiving space 212 matches the electronic display device 1. The shapes and structures of the receiving structure 21 are not limited, as long as the receiving structure 21 can accommodate the electronic display device 1 and expose the display surface 11 of the electronic display device 1, facing the transmissive/reflective component 5, such that the light of the displayed image on the electronic display device 1 can pass through the transmissive/reflective component 5 to form a virtual image on the side of the second surface 54 of the transmissive/reflective component 5.

The display system 100 may also include a covering member E. The covering member E can be coupled together with the receiving structure 21 and the transmissive/reflective component 5 to form a chamber H. The chamber H may be a closed chamber, or may be an open chamber with the opening facing the first surface 53 of the transmissive/reflective component 5. Further, the covering member E may be made of transparent material.

The support structure 22 may be a hollow triangular prism or cone, and the support structure 22 can be used for housing other parts or accessories of the display system 100. The support structure 22 may include a connecting plane 221, a connecting end 222, and a free end 223 opposite of the connecting end 222.

The connecting plane 221 is disposed between the connecting end 222 and the free end 223. The second surface 54 of the transmissive/reflective component 5 faces the connecting plane 221. Further, the free end 21b of the receiving structure 21 and the connecting end 222 of the support structure 22 are on the same side, and the connecting end 21a of the receiving structure 21 and the free end 223 of the support structure 22 are on the same side. The receiving structure 21 can be parallel to the support structure 22.

The support structure 22 may further include a light-absorbing layer (not shown). The light-absorbing layer is disposed on the surface of the support structure 22 on the side of the second surface 54 of the transmissive/reflective component 5 (e.g., the connecting plane 221). The light-absorbing layer can absorb the light passing through the transmissive/reflective component 5 during image display, so as to prevent the passing light from being reflected back, thereby affecting the contrast and brightness of the virtual image and the visual experience.

The first connecting structure may be a fixed connecting structure, i.e., the connecting end 21a of the receiving structure 21 is fixedly coupled to the transmissive/reflective component 5 through the fixed connecting structure, and the display surface of the electronic display device 1 housed in the receiving structure 21 forms a certain angle with the first surface 53 of the/reflective component 5. Particularly, the angle may be an acute angle, from 30 degrees to 60 degrees. In certain embodiments, the angle is approximately 45 degrees. The fixed connecting structure may be any fixed structure, such as engaging fixed structure.

The moveable connecting structure 4 and the transmissive/reflective component 5 may be similar to the ones previously described, the details of which are omitted herein.

In operation, under an external force, the receiving structure 21 can bring the transmissive/reflective component 5 to rotate against the supporting structure 22. That is, the transmissive/reflective component 5 may rotate with respect to the support structure 22 through the moveable connecting structure 4. Thus, a space can be formed between the receiving structure 21 and the first surface 53 of the transmissive/reflective component 5, and a space is also formed between the support structure 22 and the second surface 54 of the transmissive/reflective component 5.

When the display screen 11 of the electronic display device 1 contained in the receiving structure 21 forms a 45-degree angle with respect to the first surface 53 of the transmissive/reflective component 5, and the second surface 54 of the transmissive/reflective component 5 forms a 45-degree angle with respect to the surface 221 of the support structure 22, the generated virtual image on the side of the second surface 54 may be the same size as the image displayed on the electronic display device 1. The receiving structure 21 may be in a cubic shape, and the support structure 22 may be a triangular cone shape.

In certain embodiments, when in the display state, the receiving structure 21 housing the electronic display device 1 is located above the support structure 22, the image light from the display screen of the electronic display device 1 can directly enter the transmissive/reflective component 5 and generate a virtual image on the side of the second surface 54 of the transmissive/reflective component 5. Thus, the viewer's visual experience on the virtual image is not affected by the light from the electronic display device 1 (e.g., the contrast and brightness of the virtual image), such that the display system 100 is stable and with a desired appearance.

Further, a viewing angle adjusting structure of the display system 100 can be implemented by the moveable connecting structure 4. The viewing angle can be adjusted by rotating the transmissive/reflective component 5 with respect to the support structure 22. Alternatively, a viewing angle adjustment structure can be disposed on the bottom of the support structure 22, such that the moveable adjusting structure can be maneuvered to cause the support structure 22, the transmissive/reflective component 5, and the receiving structure 21 to rotate with respect to the viewing angle adjustment structure, while keeping the relative positions among the support structure 22, the transmissive/reflective component 5, and the receiving structure 21 fixed. Thus, the viewing angle can be adjusted without affecting the virtual image's imaging space. Similar to the previously disclosed embodiments, the display system 100 may include additional function units, such as a camera unit, the details of which are omitted herein.

FIGS. 10-13 illustrate another exemplary display system consistent with the disclosed embodiments. As shown in FIGS. 10-13, the display system 100 may include an electronic display device 1 and a packaging box (not labeled). The electronic display device 1 may have a display surface (not shown). The packaging box includes packaging body 2, a transmissive/reflective component 3, and a moveable connecting structure (not shown).

The packaging body 2 may include receiving structure 21 and the support structure 22. The receiving structure 21 is configured to house the electronic display device 1.

The transmissive/reflective component 3 may include a connecting end 31 and a free end 32 opposite to the connecting end 31, and the transmissive/reflective component 3 also includes a first surface 33 and a second surface 34 opposite to the first surface 33. The first surface faces the receiving structure 21.

The connecting end 31 of the transmissive/reflective component 3 is moveably coupled to the support structure 22 through the moveable connecting structure. When the display system 100 is in a display state, a virtual image of the image displayed by the electronic display device 1 can be formed on the side of the second surface 34 of the transmissive/reflective component 3.

The support structure 22 may be a hollow box body, and the support structure 22 has at least one open grooves on the side. The receiving structure 21 is provided on the grooves of the support structure 22, such that the image light from the display screen 11 of the electronic display device 1 can reach to the transmissive/reflective component 3. The support structure 22 includes a connecting end 22a and a free end 22b opposite the connecting end 22a, and the connecting end 31 of the transmissive/reflective component 3 is coupled to the connecting end 22a of the support structure 22 through the moveable connecting structure. When the transmissive/reflective component 3 folds and covers the support structure 22, the free end 32 of the transmissive/reflective component 3 and the free end 22b of the support structure 22 are on the same side.

The transmissive/reflective component 3 may include a transmissive/reflective device 35 and a fixing member 36 for fixing the transmissive/reflective device 35. In certain embodiments, the fixing member 36 is a fixing member made of a transparent material.

The transmissive/reflective device 35 is a device that has a surface coating and whose transmissive/reflecting ratio can be adjusted according to the ambient light. With a power supply, the transmissive/reflective device 35 can also be a liquid crystal glass device (also known as electronically-controlled liquid crystal glass). When power is applied, the transmissive rate can be adjusted by adjusting the voltage of the device to adapt to changing light environment.

The moveable connecting structure 4 may be similar to the ones previously described, the details of which are omitted herein. Other structures may also be used for the moveable connecting structure, including other rotary positioning structures, such hinge structures.

In operation, under an external force, the transmissive/reflective component 3 rotates against the supporting structure 22 to cause the display screen of the electronic display device 1 housed in the receiving structure 21 to form a predetermined angle with the first surface 33 of the transmissive/reflective component 3. Thus, a virtual image of the image displayed by the electronic display device 1 can be generated on the side of the second surface 34 of the transmissive/reflective component 3. For example, the predetermined angle may be approximately 45 degrees. When there is no need for display, the transmissive/reflective component 3 folds and covers the receiving structure 21.

Further, the display system 100 can also include a viewing angle adjusting mechanism, which may be similar to those described above. Alternatively, the viewing angle adjustment mechanism a moveable adjusting structure disposed on the bottom of the support structure 22, such that the moveable adjusting structure can be maneuvered to cause the support structure 22, the transmissive/reflective component 3, and the receiving structure 21 to rotate with respect to the viewing angle adjustment mechanism, while keeping the relative positions among the support structure 22, the transmissive/reflective component 3, and the receiving structure 21 fixed. Thus, the viewing angle can be adjusted without affecting the virtual image's imaging space.

Similar to the previously disclosed embodiments, the display system 100 may include additional function units, the details of which are omitted herein.

FIGS. 14-17 illustrate another exemplary display system consistent with the disclosed embodiments. As shown in FIGS. 14-17, the display system 100 may include an electronic display device 1 and a packaging box (not labeled). The electronic display device 1 may have a display surface (not shown). The packaging box includes packaging body 2, a transmissive/reflective component 3, and a moveable connecting structure (not shown), a reflector 5, and a fixed connecting structure (not shown). The packaging body 2 may include receiving structure 21 and the support structure 22. The receiving structure 21 is configured to house the electronic display device 1. The receiving structure 21 has a first connecting end 211 and a second connecting end 212, and the support structure 22 has a first connecting end 221 and a second connecting end 222. The second connecting end 222 of the support structure 22 is coupled to the first connecting end 211 of the receiving structure 21 through a fixed connecting structure.

The transmissive/reflective component 3 may include a connecting end 31 and a free end 32 opposite to the connecting end 31, and the transmissive/reflective component 3 also includes a first surface 33 and a second surface 34 opposite to the first surface 33. The second surface 34 faces the receiving structure 21. The connecting end 31 of the transmissive/reflective component 3 is moveably coupled to the first connecting end 221 of the support structure 22 through the moveable connecting structure.

The reflector 5 is disposed on the support structure 22 by an engaging structure or by a fixed connection. One end of the reflector 5 is close to the first connecting end 211 of the receiving structure 21, and the other end of the reflector is close to the connecting end 31 of the transmissive/reflective component 3. The reflector 5 forms a certain angle with the receiving structure 21, such as a 45-degree angle. When the display system 100 is in a display state, a virtual image of the image displayed by the electronic display device 1 can be displayed on the side of the second surface 34 of the transmissive/reflective component 3.

The display screen 11 of the electronic display device 1 housed in the receiving structure 21 can form a 45-degree angle with the reflector 5. In the display state, the reflective surface 33 of the transmissive/reflective component 3 form a predetermined angle with the display screen 11 of the electronic display device 1. The predetermined angle may be an acute angle, from 30 degrees to 60 degrees. In certain embodiments, the angle is approximately 45 degrees.

The structure of the transmissive/reflective component 3 may be similar to the transmissive/reflective component 3 illustrated in FIGS. 10-13, the details are omitted herein. The moveable connecting structure may be similar to the ones previously described, the details of which are omitted herein. Other structures may also be used for the moveable connecting structure, including other rotary positioning structures, such hinge structures.

In operation, under an external force, the transmissive/reflective component 3 rotates against the supporting structure 22 to cause the display screen of the electronic display device 1 housed in the receiving structure 21 to form a predetermined angle with the first surface 33 of the transmissive/reflective component 3. Thus, a virtual image of the image displayed by the electronic display device 1 can be generated on the side of the second surface 34 of the transmissive/reflective component 3. When there is no need for display, the transmissive/reflective component 3 folds and covers the receiving structure 21 and the support structure 22.

Further, the display system 100 can also include a viewing angle adjusting mechanism 6, which may be similar to those described above. The viewing angle adjusting mechanism 6 is implemented in a manner that the imaging space with the second surface of the transmissive/reflective component 3 is not affected when adjusting the viewing angle using the viewing angle adjusting mechanism 6.

Alternatively, the viewing angle adjustment mechanism 6 can be a moveable adjusting structure disposed on the bottom of the support structure 22, such that the moveable adjusting structure can be maneuvered to cause the support structure 22, the transmissive/reflective component 3, and the receiving structure 21 to rotate with respect to the viewing angle adjustment mechanism, while keeping the relative positions among the support structure 22, the transmissive/reflective component 3, and the receiving structure 21 fixed. Thus, the viewing angle can be adjusted without affecting the virtual image's imaging space. Similar to the previously disclosed embodiments, the display system 100 may include additional function units, the details of which are omitted herein.

Figure 18:
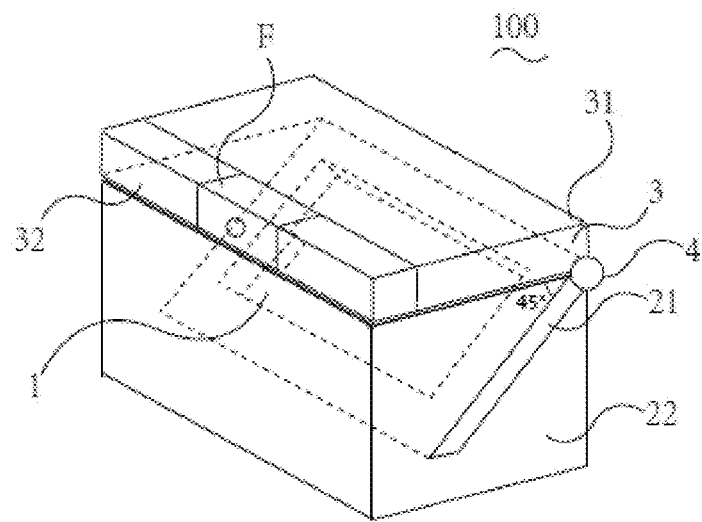
FIGS. 18-19 illustrate another exemplary display system consistent with the disclosed embodiments.
Figure 19:
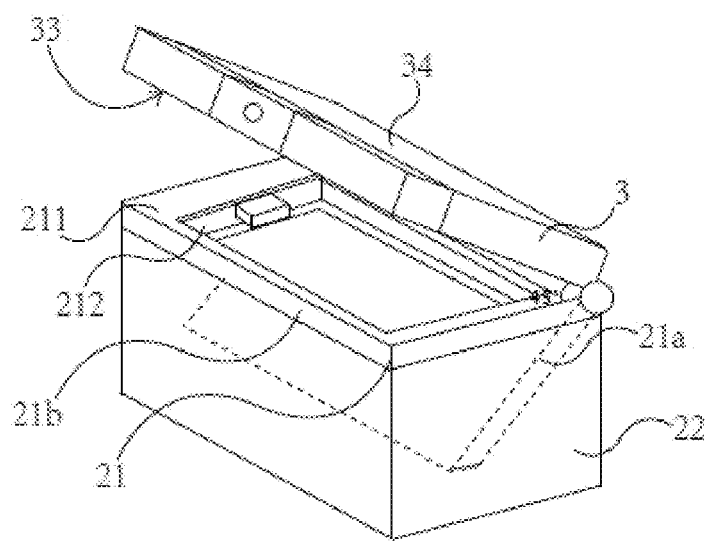

FIGS. 18-19 illustrate another exemplary display system consistent with the disclosed embodiments. As shown in FIGS. 18-19, the display system 100 may include an electronic display device 1 and a packaging box (not labeled). The electronic display device 1 may have a display surface (not shown). The packaging box includes packaging body 2, a transmissive/reflective component 3, and a moveable connecting structure 4. The packaging body 2 may include receiving structure 21 and the support structure 22. The receiving structure 21 is configured to house the electronic display device 1. The transmissive/reflective component 3 may include a connecting end 31 and a free end 32 opposite to the connecting end 31, and the transmissive/reflective component 3 also includes a first surface 33 and a second surface 34 opposite to the first surface 33.

The receiving structure 21 includes a hollow frame 211, and the frame 211 form a receiving space 212 for housing the electronic display device 1. The receiving space 212 matches the electronic display device 1. The receiving structure 21 includes a connecting end 21*a* and a free end 21*b*.

The support structure 22 may be a hollow box body, and the connecting end 21*a* of the receiving structure 21 may be fixedly coupled to the connecting end 31 of the transmissive/reflective component 3 through a fixed connecting structure. The receiving structure 21 has a fixed angle with the transmissive/reflective component 3. The fixed angle may be predetermined. For example, the fixed angle may be an acute angle, from 30 degrees to 60 degrees. In certain embodiments, the angle is approximately 45 degrees.

Under an external force, the transmissive/reflective component 3 can cause the receiving structure 21 to rotate in or out the support structure 22. The transmissive/reflective component 3 may be similar to the transmissive/reflective component 3 in FIGS. 10-13, the details of which are omitted.

The moveable connecting structure 4 may be similar to the ones previously described, the details of which are omitted herein. Other structures may also be used for the moveable connecting structure, including other rotary positioning structures, such hinge structures.

In operation, under an external force, the transmissive/reflective component 3 rotates against the supporting structure 22 to cause the display screen of the electronic display device 1 housed in the receiving structure 21 to form a predetermined angle with the first surface 33 of the transmissive/reflective component 3. Thus, a virtual image of the image displayed by the electronic display device 1 can be generated on the side of the second surface 34 of the transmissive/reflective component 3. When there is no need for display, the transmissive/reflective component 3 folds and covers the receiving structure 21.

Further, the display system 100 can also include a viewing angle adjusting mechanism, which is the moveable connecting structure. That is, the moveable connection structure not only moveably connects the transmissive/reflective component 3 and the support structure 22, but also is used to adjust the view angle.

More specifically, through the moveable connecting structure, the transmissive/reflective component 3 causes the receiving structure 21 to rotate. Because the angle between the receiving structure 21 and the transmissive/reflective component 3 is fixed, it does not affect the formation of the virtual image of the image displayed by the electronic display device, only adjusting the space for the virtual image on the side of the second surface of the transmissive/reflective component. Thus, the viewing angle can be adjusted. Further, because the transmissive/reflective component is moveably connected to the edge of the supporting structure, the virtual image space on the side of the second surface of the transmissive/reflective component is less affected during the viewing angle adjustment. Further, similar to the previously disclosed embodiments, the display system 100 may include additional function units, the details of which are omitted herein.

Figure 20:
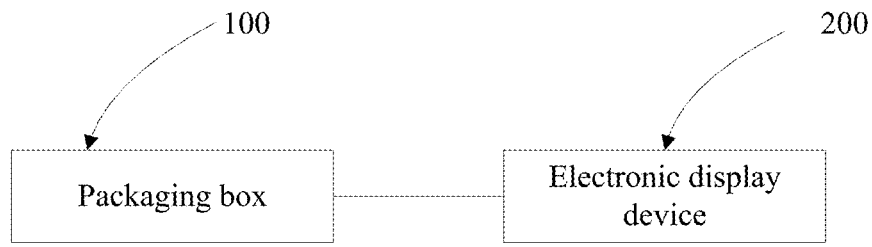
FIG. 20 illustrates an exemplary configuration of the display system of electrically connected packaging box and electronic display device consistent with disclosed embodiments.
Figure 21:
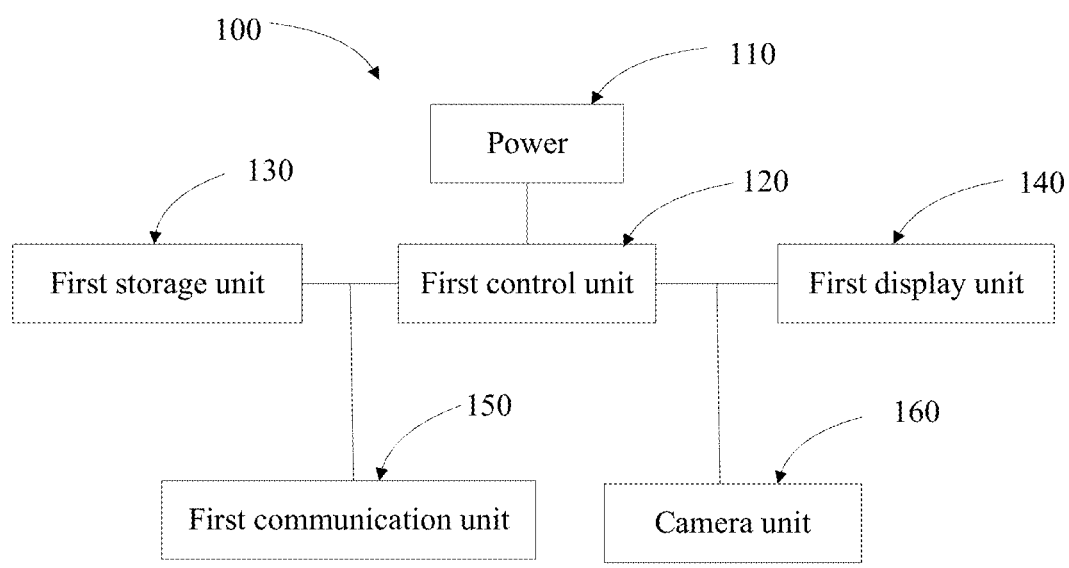
FIG. 21 illustrates a circuitry block diagram of the packaging box consistent with disclosed embodiments.
Figure 22:
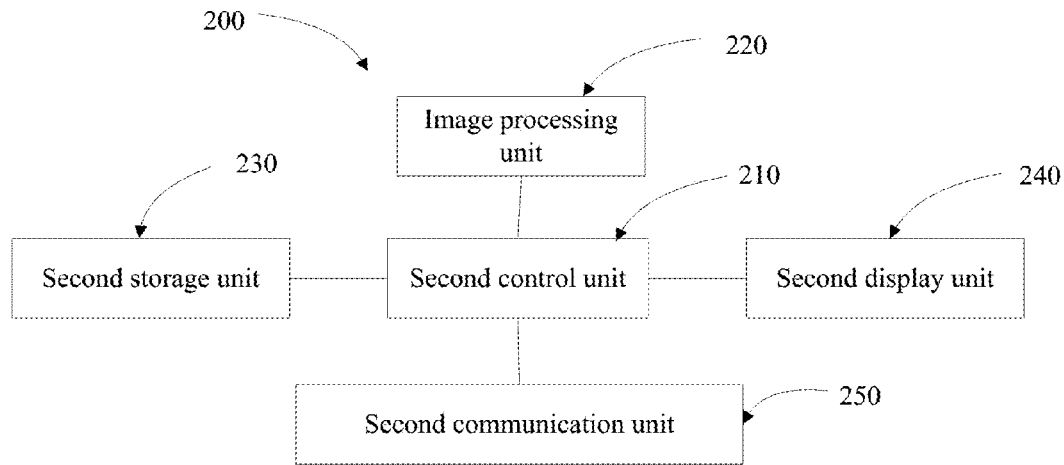
FIG. 22 illustrates a circuit block diagram of the electronic display device consistent with disclosed embodiments.

FIG. 20 shows an exemplary configuration of the display system of electrically connected packaging box and electronic display device, FIG. 21 shows a circuitry block diagram of the packaging box, and FIG. 22 shows a circuit block diagram of the electronic display device.

As shown in FIG. 20, within the display system, the packaging box 100 and the electronic display device 200 are electrically connected. The packaging box 100 and the electronic display device 200 can exchange signals/messages. The packaging box 100 and the electronic display device 200 may be electrically connected in various ways. For example, the packaging box 100 and the electronic display device 200 may be electrically connected through a direct wire connection, through a wireless connection, such as Bluetooth communication mode, NFC (Near Field Communication) mode, WiFi mode, or RFID communication mode, or through respective USB interface modules.

As shown in FIG. 21, the packaging box 100 may include a first control unit 120, a first storage unit 130, a first display unit 140, and a first communication unit 150. The first control unit 120 is coupled with the first storage unit 130, the first communication unit 150, and the first display unit 140. The first control unit 120 may be configured to control the entire packaging box. For example, the first control unit 120 may be a CPU (central processing unit) or a digital signal processor.

The first storage unit 130 may be used for storing information required for operation of the packaging box, including a random access memory (RAM) and a read only memory (ROM). The ROM may contain program code and instructions for the first control unit 120 to control the packaging box 100.

The first communication unit 150 is used by the packaging box 100 for establishing a communication to the electronic display device 200 and/or other networks. For example, the first communication unit 150 may be a USB interface module, a WIFI module, an NFC communication module, an RFID communication module, or a Bluetooth communication module. In certain embodiments, the first communication unit 150 may be a USB interface module. The USB interface module may include a control module and a USB interface. The USB control module controls the USB interface, and the USB interface can be connected to a USB interface of the electronic display device 200, for data transmission and/or as a power supply interface. When used as a power supply interface, the power supply of the packaging box or an external power supply can be used to charge the electronic display device 200.

The first display unit 140 is used to display control information for the packaging box 100 to control the electronic display device 200. In certain embodiments, the first display unit 140 is a touch screen. When touch screen displays the control information for controlling the electronic display device 200, the user can operate directly on the touch screen, enabling the operation of the electronic display device 200. The packaging box 100 can be powered by an external AC or DC power.

Further, the packaging box 100 can also include a power supply 110, and the power supply 110 may provide power for the entire system. In addition, the power supply 110 may also be a charging power supply for charging the electronic display device 200. That is, the packaging box 100 can be used a portable power supply. Power supply 110 may include any appropriate power source, such as a battery, a solar cell, a fuel cell, or other energy harvesting device. Because the packaging box 100 can be used as a portable power supply, the user experience can be further improved.

Further, the packaging box 100 can also include a camera unit 160. The camera unit 160 can be used to capture images and to transmit the captured image to the electronic display device 200 or the packaging box 100. Thus, the packaging box 100 can also be used as a camera, giving users a new experience.

Further, the packaging box 100 can also include an audio module, including a power amplifier device. The audio module may be controlled by the first control unit 120. The first storage unit of the packaging box 100 may store audio data, such as music, and the audio module may playback the audio data. That is, the packaging box 100 can also be used as a music player. In addition, music on the electronic display device 200 can be played by the packaging box 100, improving the user experience.

Further, the packaging box 100 can also include a first image processing unit. The first image processing unit can be connected with the first control unit 120 to process received image information. The processed images can be displayed on the first display unit, or on the electronic display device.

For example, to control the electronic display device 200 through the packaging box 100, when the packaging box 100 receives control information from the electronic display device 200, the first image processing unit can generate icons corresponding to the control information, which can be easily identified by the user. When the electronic display device is called, the call control information can be transmitted to the packaging box. Based on the control information, the first image processing unit can generate common answer and hang up icons to be displayed on the first display unit. If the first display unit is a touch screen, the user can directly touch the appropriate icon to answer or hang up. If the first display unit is not a touch screen, after viewing the displayed icons, the user can operate through an external input device or keys on the packaging box. Because the icons corresponding to the control information generated by the first image processing unit are displayed on the first display unit of the packaging box, it facilitates the user to control the electronic display device through the packaging box. Further, the first image processing unit may also process images to be displayed by the electronic display device, and is similar to the image processing unit 220 of the electronic display device, which is further described in sections below.

As shown in FIG. 22, the electronic display device 200 includes a second control unit 210, a second storage unit 230, a second display unit 240, and a second communication unit 250. The second control unit 210 is connected to the second storage unit 230, the second display unit 240, and the second communication unit 250. The second control unit 210 is used for controlling the entire electronic display device 200. For example, the second control unit 210 may be a CPU or a digital signal processor.

The second storage unit 230 may be used for storing information required for operation of the electronic display device, including a random access memory (RAM) and a read only memory (ROM). The ROM may contain program code and instructions for the second control unit 210 to control the electronic display device.

The second communication unit 250 is used by the electronic display device 200 for establishing a communication to the packaging box 100 and/or other networks. For example, the second communication unit 250 may be a USB interface module, a WIFI module, an NFC communication module, an RFID communication module, or a Bluetooth communication module. In certain embodiments, the second communication unit 250 may be a USB interface module. The USB interface module may include a control module and a USB interface. The USB control module controls the USB interface, and the USB interface can be connected to a USB interface of the packaging box 100, for data transmission. The second display unit 240 displays images, such as 2D image or 3D images. The second display unit 240 may be a liquid crystal display, OLED displays, LED displays and the like.

Further, the electronic display device 200 can also include an image processing unit 220. The image processing unit 220 is used for processing the images to be displayed by the second display unit 240, and processed images are then transmitted to the second display unit 240 for display. More specifics of the image processing unit 220 are described in sections below.

Figure 23:
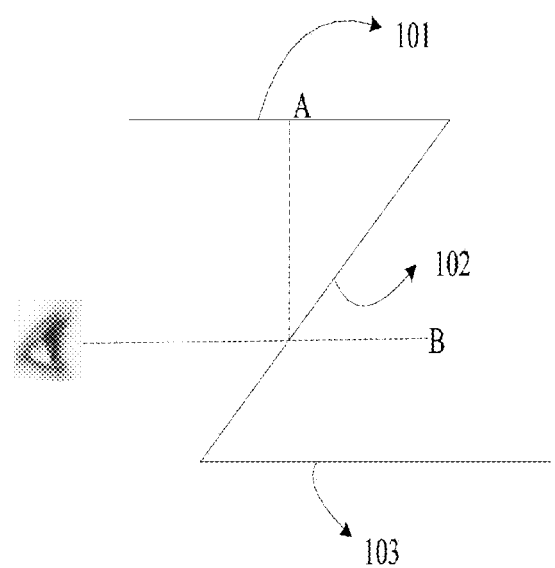
FIG. 23 illustrates an imaging process of the display system consistent with disclosed embodiments.

FIG. 23 shows an imaging process of the display system. As shown in FIG. 23, plane 101 is the plane where the receiving structure of the packaging box is located, plane 102 is the plane where the transmissive/reflective component of the packaging box is located, and plane 103 is the plane where the lower support structure of the packaging box is located. When the electronic display device is placed in the receiving structure, i.e., the display screen is on the plane 101, light from a point A on the display screen, representing the signal strength of the point A, is reflected into the eyes of the user via the transmissive/reflective component on the plane 102.

Because the angle between the receiving structure and the transmissive/reflective component is less than 90 degrees, the user can see the image of A from the point B behind the transmissive/reflective component. Further, because the transmissive/reflective component is also transmissive, the user can also see real objects and scenes behind the transmissive/reflective component, forming a display effect combining the virtual image and the real scene together.

FIG. 24*a* shows an imaging process of a conventional autostereoscopic display apparatus, and FIG. 24*b* shows an imaging process of the disclosed display system for autostereoscopic display. The electronic display device is capable of displaying 3D images, such as a mobile phone, a computer, a game console, and so on.

As shown in FIG. 24*a*, the 3D image includes a left view image for the left eye and a right view image for the right eye with a parallax between the left view image and the right view image. The plane 104 represents the screen of the electronic display device, 'a' and 'b' represent a point in the left view image and a point in the right image corresponding to a same point in an actual scene, and 'c' and 'd' represent another point in the left view image and another point in the right image corresponding to another same point in the actual scene.

Light from points 'a', 'b', 'c', and 'd' passes through a directional light splitting device, such as a lens array or a parallax barrier, etc., enters into the viewer's left eye and right eye, respectively, which is then synthesized by the viewer's brain into 'E' and 'F' two points with three-dimensional effect.

As shown in FIG. 24*b*, assuming that the transmissive/reflective component is placed parallel to the receiving structure, which is equivalent to placing a transmissive/reflective lens surface 105 in parallel to the plane 104 in FIG. 24*a*. Thus, light from the point 'a' passes through the transmissive/reflective lens surface 105 to form an image point a'. Similarly, points b', c', and d' are image points of 'b', 'c', and 'd', respectively. The viewer then can see 3D image points E' and F' through the transmissive/reflective lens surface 105.

Comparing the three-dimensional display effect of the two display apparatus, the positions E' and F' in FIG. 24*b* are mirror images of the points E and F in FIG. 24a along the horizontal center axis. Thus, in FIG. 24b, the viewer can see a reversed or upside-down image of the image displayed on the electronic display device.

FIG. 25 shows an imaging process of the display system using 3D glasses. As shown in FIG. 25, points 'a' and 'b' are two points with parallax on plane 101 of the display screen of the electronic display device. Through the glasses, the viewer sees image points a' and b' of the points 'a' and 'b' behind the transmissive/reflective lens surface 102. If the light from point 'a' enters the right eye through the right lens of the glasses, and the light from point 'b' enters the left eye through the left lens of the glasses, the angle between the plane 101 and the transmissive/reflective lens surface 102 can be set such as the light from points 'a' and 'b' enters into the glasses of the viewer by being reflected by the transmissive/reflective lens surface 102. The viewer can wear the glasses and view the 3D image point E formed by the points a' and b' behind the transmissive/reflective lens surface 102.

Figure 26:
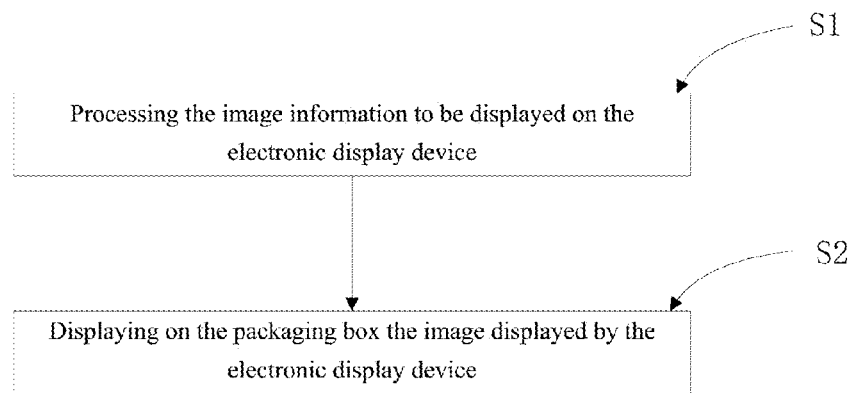
FIG. 26 illustrates a flow chart of an exemplary display process consistent with disclosed embodiments.

Based on the above imaging principles of the autostereoscopic display apparatus and the glass-based stereoscopic display apparatus, FIG. 26 shows a flow chart of an exemplary display process of the disclosed display system. As shown in FIG. 26, the display process may include the following steps.

Step S1, processing the image information to be displayed on the electronic display device. The image information may include texts, images, and video, etc. More specifically, the image processing step may include the following sub-steps.

Figure 27A:
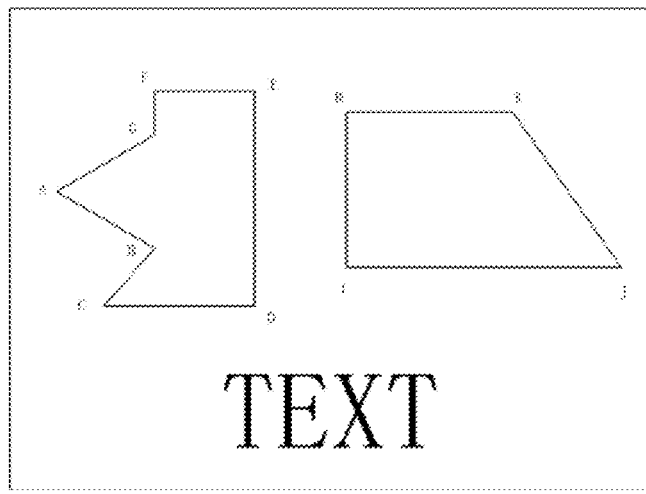
FIG. 27a illustrates an exemplary image without flipping processing consistent with disclosed embodiments.

Step S11, image flipping processing, i.e., flipping the image to be displayed. Because the image displayed by the packaging box is a mirror image displayed on the electronic display device, the image to be displayed need to be flipped first, so as to display a normal image on the packaging box. FIG. 27a shows an exemplary image without flipping processing, and FIG. 27b shows an exemplary image with flipping processing.

Figure 27B:
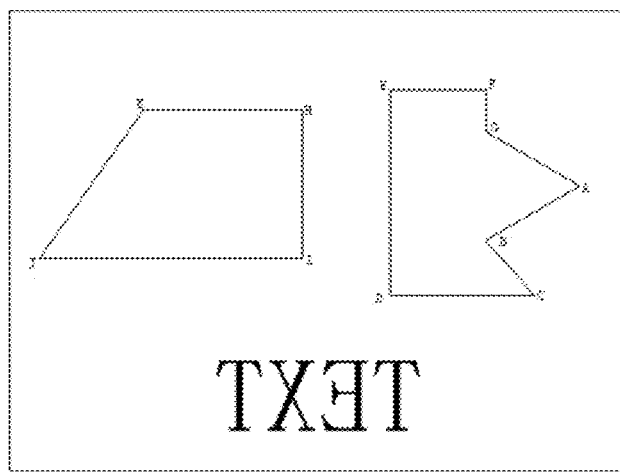
FIG. 27b illustrates an exemplary image with flipping processing consistent with disclosed embodiments.

As shown in FIG. 27a and FIG. 27b, when no image processing is performed, the polygon ABCDEFG, the trapezoid HIJK, and the text TEXT are displayed according to the normal display of the electronic display device. However, a mirror image will be displayed on the packaging box, with left and right interchanged. That is, the imaged polygon ABCDEFG is on the right side of the imaged trapezoid HIJK while the original polygon ABCDEFG is on the left side of the original trapezoid HIJK; the imaged point A of polygon ABCDEFG is the most right side point of the imaged trapezoid HIJK while the point A of original polygon ABCDEFG is the most left side point of the original trapezoid HIJK; and the imaged text TEXT is also mirrored or left/right interchanged. Thus, the displayed image by the packaging box is a reversed image, causing undesired user experience.

Thus, the image displayed on the electronic display device needs to be processed such that the image displayed on the packaging box is a normal image, improving the user experience. Specifically, according to the type of information of the image to be displayed, targeted image flipping processing can be performed. For example, as shown in FIG. 27b, the image displayed by the electronic display device can be processed to flip the image. Thus, the image displayed on the packaging box can be the same as the image shown in FIG. 27a, a normal image. The image flipping processing may be performed as follows.

Step one, image preprocessing, i.e., preprocessing the image information. Specifically, the image preprocessing can include: identifying the image information (the image information may include texts, images, and videos) and, according to different image information, performing corresponding preprocessing. For example, when the image information is an image, no preprocessing is needed; when the image information is text, redrawing the bitmap image corresponding to the text; and when the image information is video, decoding the video to convert the video into image frames (i.e., images of individual frames).

Step two, rearranging pixels of the image, i.e., rearranging the pixels of the image after the image preprocessing. For example, the rearranging operation can be performed by: assuming a picture comprising pixels arranged in an M×N matrix, N pixels of the each row of the pixels are sequentially labeled, from left to right, 0, 1, 2, 3, . . . , N−3, N−2, N−1, and N, the sequence is reversed, i.e., the rightmost N pixel is rearranged to the position of the leftmost pixel 0, and the N−1 pixel is rearranged to the position of pixel 2, and so on. After the above rearrangement, the image is flipped.

Thus, using the image flipping processing described above, the displayed by the electronic display device can be displayed normally on the packaging box. The user can see normally on the packaging box the image displayed by the electronic display device display, without the need to open the packaging box frequently and to take out the electronic display device. The user can directly experience a variety of display effects and functional effects of the electronic display device.

Step S12, adjusting the display brightness/contrast, i.e., based on the brightness of the environment surrounding packaging box, adjusting the brightness/contrast of the image displayed by the electronic display device and/or adjusting the Gamma value of the electronic display device. By adjusting the brightness/contrast of display of the electronic display device and/or adjusting the Gamma value of the electronic display device, the display effect of the image display on the packaging box can be improved.

In one embodiment, the display brightness/contrast can be adjusted as follows. One or more photosensitive component may be provided on the electronic display device or on the packaging box, and the current brightness value of the environment surrounding the packaging box can be obtained. Further, a difference between the brightness value and a predetermined threshold value is calculated, where the predetermined threshold value is the brightness value displayed by the electronic display device corresponding to normal environment.

When the difference is positive, it means that the environment surroundings the packaging box is relatively bright, which may be undesired for display on the packaging box, and the brightness/contrast of display of the electronic display device is adjusted and/or the Gamma value of the electronic display device is adjusted according to the positive value.

When the difference is negative, it means that the environment surroundings the packaging box is relatively dark, and the brightness/contrast of display of the electronic display device is adjusted and/or the Gamma value of the electronic display device is adjusted according to the negative value. For example, when the brightness of the environment surroundings the packaging box decreases, the brightness/contrast of display of the electronic display device is also decreased, and the Gamma value of the electronic display device is also adjusted. Thus, while maintaining a normal display effects, the power consumption can be lowered.

Also for example, when the brightness of the environment surroundings the packaging box decreases, the brightness/ contrast of display of the electronic display device and the Gamma value of the electronic display device are unchanged, such that the display effect of the electronic display device can be improved.

In certain embodiments, a table is established based on the environment brightness and corresponding required display brightness/contrast and the Gamma value of the electronic display device. Thus, a corresponding relationship between the difference value and the display brightness/contrast and/or the Gamma value of the electronic display device can be created.

After the difference is calculated, the corresponding display brightness/contrast and/or Gamma value of the electronic display device can be found based on the table and the corresponding relationship. The corresponding brightness/contrast and/or Gamma value can then be used to adjust the brightness/contrast and/or Gamma value of the electronic display device. Of course, the brightness/contrast and/or Gamma value of the electronic display device can also be adjusted according to the environment brightness.

More specifically, in one embodiment, the display brightness/contrast and/or the Gamma value of the electronic display device can be adjusted to match the ambient brightness by the following steps.

Step one, pre-setting a threshold value of the image display for the normal environment. For example, the threshold value may be set as 50, the value may be set to 0 for darkroom environment, or the value may be set to 100 for bright light environment.

Step two, obtaining data from the photosensitive component in real-time. After obtaining the data from the photosensitive component, the data is converted to the corresponding value.

Step three, determining the difference between the value from the photosensitive component and the threshold value, as denoted with $\beta$. When $\beta>0$, it indicates that the environment is relatively bright. The greater the $\beta$ value, the brighter the environment, and the corresponding display brightness/contrast and/or Gamma value of the electronic display device need to be adjusted. On the other hand, when $\beta<0$, it indicates that the environment is relatively dark. The less the $\beta$ value, the darker the environment, and the corresponding display brightness/contrast and/or Gamma value of the electronic display device need to be adjusted.

For an image, its brightness/contrast can be adjusted using gray scale linear transformation, represented by the following equation:

$$y=[x-127.5*(1-B)]*s+127.5*(1+B);$$

where x is the pixel value before adjustment; y is the pixel value after the adjustment; the B is the brightness parameter with a value between [−1, 1] and used to adjust brightness; s is used to adjust the contrast, with an arctan(s) value [1, 89], and $s=\tan((45+44*c)/180*\pi)$, where c is a value between [−1, 1] and used to adjust the contrast.

Particularly, when B=0, y=(x−127.5)*s+127.5, only contrast is adjusted. When c=0 and s=1, y=x+255*B, only the brightness is adjusted.

Thus, based on the environment brightness of the packaging box, the brightness/contrast and/or Gamma value of the electronic display device can be adjusted. The display effect of the image displayed on the packaging box can be improved, while improving the realism of combined virtual images and real images.

Returning to FIG. 26, after Step S1, the display process further includes:

Step S2, displaying on the packaging box the processed image displayed by the electronic display device. The image displayed on the electronic display device is processed and the image displayed by the electronic display device is displayed on the packaging box according to the structure of the packaging box.

Thus, using the disclosed display method of the electronic display system, the image displayed by the electronic display device can be displayed on the packaging box, and at the same time the image on the electronic display device can be displayed by the packaging box to converge with the surrounding environment of the packaging box, achieving combined virtual images and real images. The packaging box not only is less likely thrown away, but also brings a better user experience.

Figure 28:
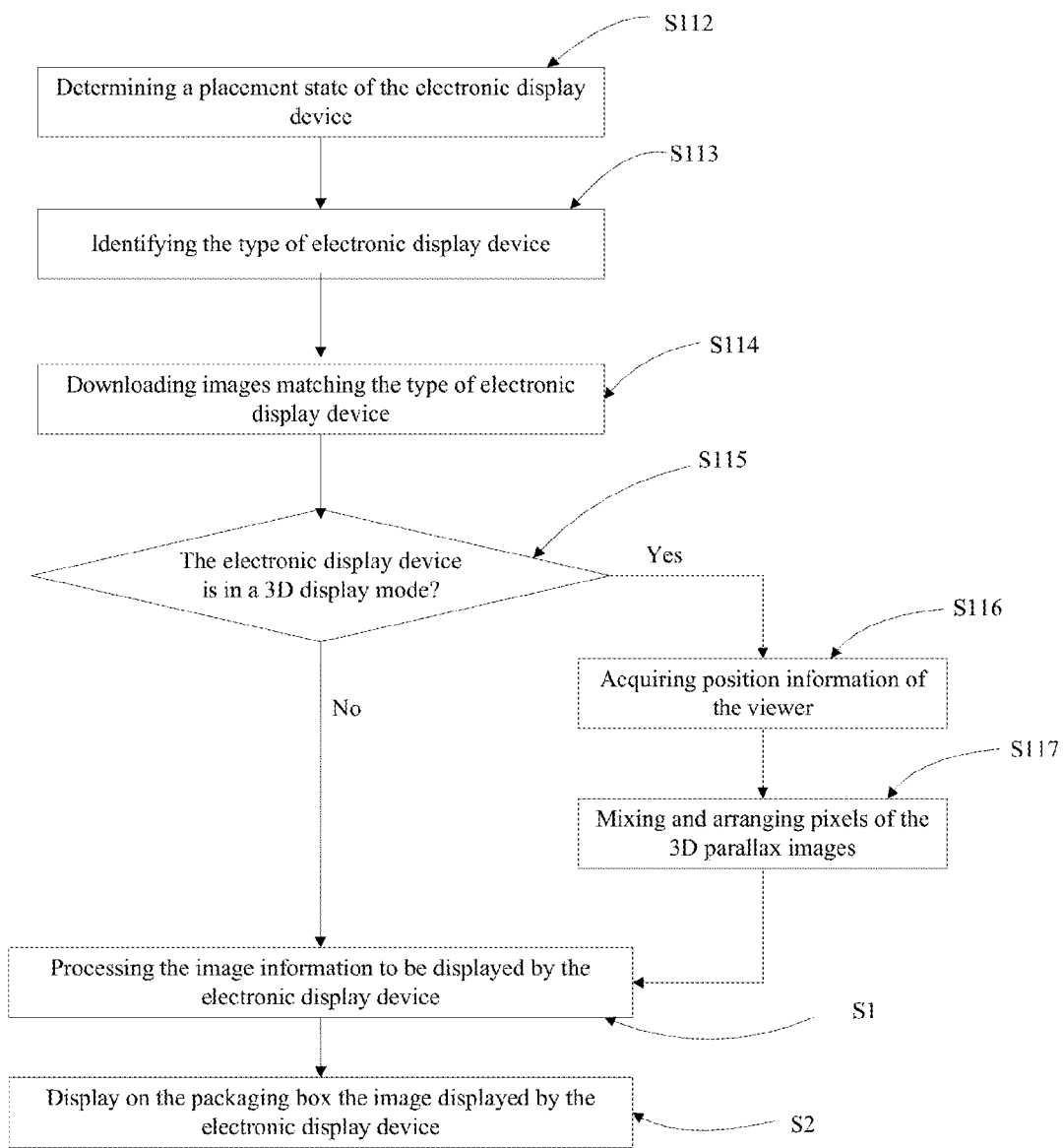
FIG. 28 illustrates a flow chart of an exemplary display method consistent with disclosed embodiments.

FIG. 28 shows a flow chart of an exemplary display method of the display system according to disclosed embodiments. The display method is similar to the method shown in FIG. 26. However, as shown in FIG. 28, before the Step S2, displaying on the packaging box the image displayed by the electronic display device, the display method further including the following steps.

Step S112, determining a placement state of the electronic display device. Specifically, it is determined whether the electronic display device is placed on the specified position of the packaging box, i.e., the placement state. When the electronic display device is placed on the specified position of the packaging box, i.e., the correct placement state, the image on the electronic display device can be displayed properly on the packaging box.

Further, if the electronic display device is not placed on the specified position of the packaging box, i.e., the incorrect placement state, an alert signal may be issued to alert the user to place the electronic display device on the specified location. The placement state can be determined by several ways, such as using a multi-axis gyroscope, using an orientation sensor, or using the USB interface module of the USB device on the packaging box.

When using the USB interface module of the USB device on the packaging box, after the electronic display device is placed in the packaging box, both the electronic display device and the packaging box are in working condition. The USB interface module of the USB device on the electronic display device are electrically connected to the USB interface module of the USB device on the packaging box, which means that the electronic display device is placed in the specified location.

Additionally, in certain embodiments, the placement state of the electronic display device may include a normal placement state and an inverted placement state. The normal placement state is when the electronic display device is placed in the specified location normally, while the inverted placement state is when the electronic display device is placed on the same specified location but with a phase difference of 180 degrees. That is, the electronic display device is rotated by 180 degrees on the same horizontal plane.

When the placement state is considered, certain previously described steps may be modified accordingly. For example, in Step S1, processing the image information to be displayed by the electronic display device, the original image flipping processing in Step S11 includes the followings.

Step S11a, determining whether the electronic display device is in a normal placement state or an inverted placement state.

Step S11b, according to the placement state of the electronic display device, performing flipping processing on the image to be displayed. Specifically, when the electronic display device is in a normal placement state, the flipping processing is performed according to FIGS. 27a and 27b.

When the electronic display device in an inverted placement state, similarly, the image to be displayed is flipped according to the mirror imaging principle. However, different from the above flipping processing, the rearrangement of the pixel is performed by sequentially exchanging the pixels of each column of pixels from top to bottom locations. For example, the first pixel on the first row is exchanged with the first pixel of the M row, the second pixel of the first row is exchanged with the second pixel of the M row, and so on. Or the entire row of pixels may be exchanged at the same time, such as exchanging the first row pixels with the M row pixels, exchanging the second row pixels with the M−1 row pixels, and so on.

Further, after Step S112, the display method may also include the following steps.

Step S113, identifying the type of electronic display device. The type of electronic display device may include: a mobile communication terminal, a flat panel display, a PC, and a gaming device, etc. The installed operating system and/or image display device may also be included.

After the electronic display device is placed in the packaging box, different types of electronic display device may require different image display formats, such as a 3D display format or a normal 2D image display format, and the display effect of the same image may be different for different types of electronic display devices. For example, for images suitable for display on a mobile communication terminal displays the image, the display effect may be different when the images are displayed on a game device having a different operating system.

Step S114, downloading images matching the type of electronic display device. The electronic display device may be connected to the Internet through a wired or wireless connection, and may download an image matching the type of electronic display device from an application store. For example, when the mobile communication terminal with an android operating system is connected to the Internet, it may automatically find the appropriate image of the mobile communication terminal, and download the image for display on the mobile communication terminal. The downloaded image can be stored on the electronic display device or on the packaging box. In one embodiment, the downloaded image is stored on the electronic display device.

Further, additionally or optionally, in certain embodiments, the display method may further the following steps.

Step S115, determining whether the electronic display device is in a 3D display mode. When it is determined that the electronic display device is not in the 3D display mode, the method proceeds to Step S1. When the electronic display device is in the 3D display mode, the method further includes the followings.

Step S116, acquiring position information of the viewer. Specifically, using a tracking device installed on the packaging box, the viewer is tracked and the position of the viewer is determined.

S117, mixing and arranging pixels of the 3D parallax images. Specifically, after the position information of the viewer is determined, a current left view image with motion parallax relative to the previous left view image and a current right view image with motion parallax relative to the previous right view image are generated based on the position information, and the current left view image and the current right view image are combined into the 3D image. For example, the process of mixing and arranging pixels of a 3D parallax image can include the followings.

Step one, creating a view image index coefficient table. Specifically, for a 3D image with a left view image L and a right view image R, each pixel in the left view image L may comprise three sub-pixels, the red sub-pixel value $L_R$, the green sub-pixel value $L_G$, and the blue sub-pixel value $L_B$. Similarly, each pixel in the right view image R may comprise three sub-pixels, the red sub-pixel value $R_R$, the green sub-pixel value $R_G$, and the blue sub-pixel value $R_B$. Typically, combined pixels of a 3D image are a simple combination of the pixels of the left view image and the right view image. Thus, there is a fixed 3D display region. When a viewer is not in the display region, undesired display effect, such as ghosting, or distortion, etc., may appear.

Thus, a proportion coefficient, i.e., view image index coefficient k, for combining the left view image and the right view image may be adjusted based on the viewer's position. The view image index coefficient k can be obtained empirically. For example, when viewing from different angles, optimum or desired 3D images may be obtained or observed to analyze the combination proportion between the left view image and the right view image, such that the k value corresponding to individual viewing angles can be determined. The k values corresponding to various viewing angles can then be collected to create the view image index coefficient table. Of course, other methods may also be used to determine the k values, such as using a mathematical model of linear function or nonlinear function.

Step two, based on the viewer's position, searching the view image index coefficient corresponding to the viewer's position. The view image index coefficient table contains the corresponding relationships between the view image index coefficient and the viewer's position (e.g., the viewing angles).

Step three, rearranging the sub-pixels of the 3D image. For example, according to the view image index coefficient table, the following equations can be used to obtain combined pixel values of the new 3D image:

$$N_R = L_R * k + R_R * (1-k);$$

$$N_G = L_G * k + R_G * (1-k);$$

$$N_B = L_B * k + R_B * (1-k);$$

where k is the view image index coefficient, and $0 \leq k \leq 1$.

Other methods may also be used to combine the pixels of the 3D images. Afterwards, Step S1 may be performed.

Thus, by using the disclosed display method, the display effect of the 3D images on the packaging box can be improved. Meanwhile, according to the structure of the packaging box, the environment surrounding the packaging box is a real scene, the finally-formed virtual image is located as a real three-dimensional space, especially when the electronic display device displays the 3D image. Such combined 3D images and real scene can break through the limitations of the display interface on the electronic display device, gives a more realistic 3D viewing experience. For example, when the 3D image displayed is a road stretches continuously, for a conventional 3D display device, the viewer might have a sense of oppression and/or vertigo because the road cannot extend as limited by the display boundary of the electronic display device. However, when using the disclosed display system, such limitation can be overcome, and a borderless display effect may be achieved, giving the viewer unlimited reverie space. Of course, the disclosed display system is not limited to displaying 3D images, it can also be used to display 2D images. The combination of 2D and true 3D space gives the viewers a new experience.

In addition, in some applications, such as shooting games or racing games, when the user moves its body, after the tracking device on the packaging box detects the changes of the user's viewing position or viewing angle, the game scene can be changed according to movements of the user's position. For example, the user may see more of the scene when viewing sideways, increasing the interestingness of the packaging box display and improving the user experience.

Figure 29:
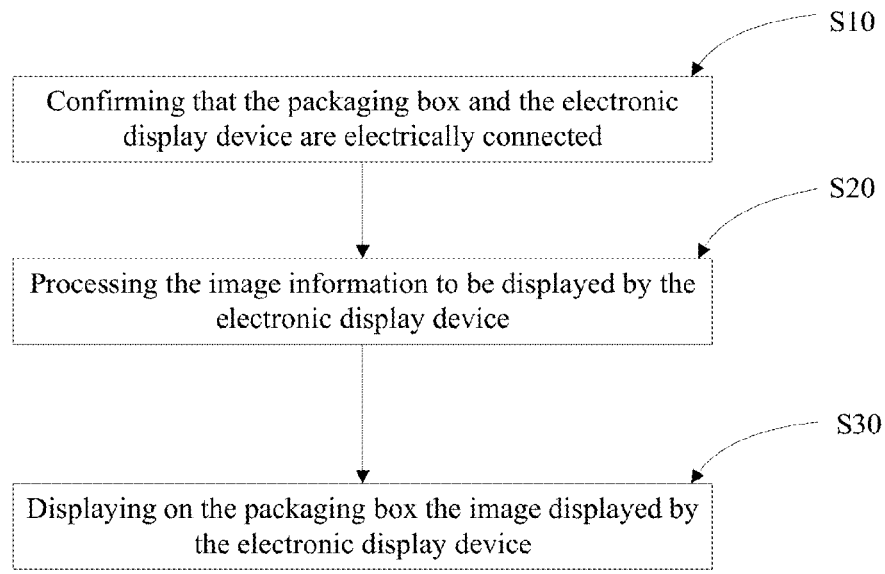
FIG. 29 illustrates a flowchart of another exemplary display method consistent with disclosed embodiments.

FIG. 29 shows a flowchart of another exemplary display method of the disclosed display system. As shown in FIG. 29, the display method for the display system may include the following steps.

Step S10, confirming that the packaging box and the electronic display device are electrically connected. The electrical connection between the packaging box and the electronic display device may include: wire connection, connection using a pair of USB interface modules, WiFi connection, NFC connection, Bluetooth connection, or RFID connection, etc. More specifically, the following sub-steps may be included.

Step S11, receiving an electric signal or message sent from the electronic display device.

Step S12, confirming the reception of the message. After receiving the message from the electronic display device, the packaging box returns a response signal or message to the electronic display device. Thus, the electrical connection between the electronic display device and the packaging box is confirmed.

Step S20, processing the image information to be displayed by the electronic display device, similar to Step S1 shown in FIG. 26.

Step S30, displaying on the packaging box the image displayed by the electronic display device, similar to Step S2 shown in FIG. 26.

Thus, using the disclosed display method, once the connection and communication between the electronic display device and the packaging box is confirmed, it can also be confirmed that both the electronic display device and the packaging box are in working condition. It may be easy to control the electronic display device through the packaging box, and the electronic display device can be charged via the packaging box.

Using the disclosed display method, images displayed by the electronic display device can be displayed on the packaging box, and the packaging box can establish a communication connection with the electronic display device, facilitating the user to know the status of the packaging box and the electronic display device. The packaging box can be used to charge the electronic display device, and can be used as a portable power supply. The packaging box not only is not likely to be thrown away, but also brings a new user experience.

Figure 30:
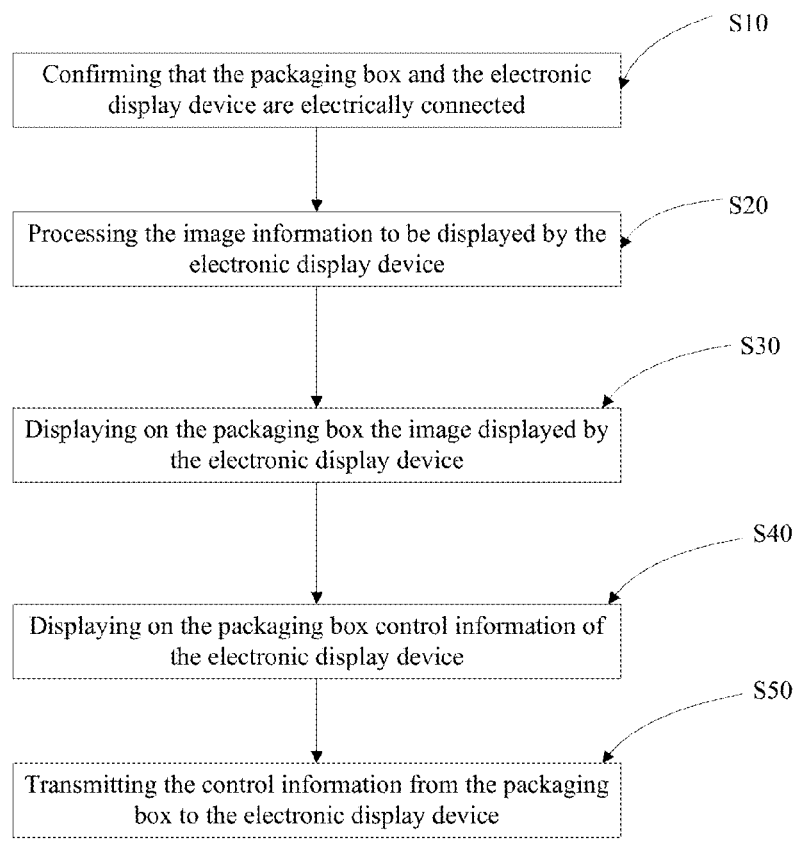
FIG. 30 illustrates a flowchart of another display method consistent with disclosed embodiments.

FIG. 30 shows a flowchart of another display method of the disclosed display system. As shown in FIG. 30, in addition to the above steps S10, S20, and S30, the display method also includes the followings.

Step S40, the packaging box displays control information of the electronic display device. Specifically, the box body of the packaging box is provided with a display screen. After the packaging box receives information sent from the electronic display device, which includes information for controlling the electronic display device, the packaging box receives display the control information for the electronic display device on the display screen of the box body.

Step S50, the packaging box transmits the control information to the electronic display device. Based on the control information for the electronic display device displayed on the packaging box, control information can be sent to the electronic display device through the packaging box, realizing control over the electronic display device.

Further, the steps described in FIG. 28 may also be included in this display method. For example, the steps in FIG. 28 may be performed between S10 and S20 in FIG. 30. Any appropriate combinations may be used.

Thus, by using the disclosed display methods, the electronic display device can be controlled by the packaging box. The packaging box containing the electronic display device not only can display on the packaging box the image displayed by the electronic display device, but also control the electronic display device through the packaging box, bringing a new user experience. In addition, without direct manipulation of the electronic display device, reducing the chances when the user needs to open the packaging box or even damage the packaging box to access the electronic display device contained in the box body of the packaging box.

Figure 31A:
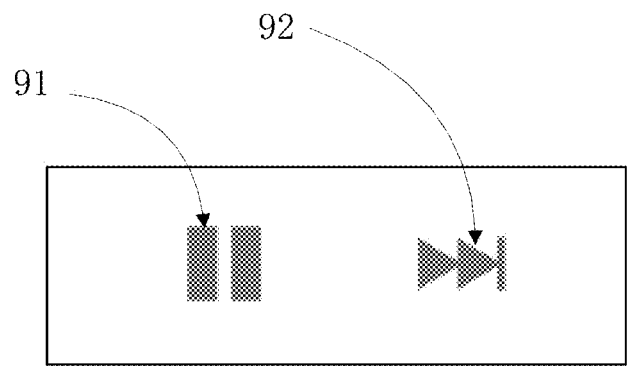
FIGS. 31a, 31b, and 31c illustrate exemplary applications of controlling the electronic display device through the packaging box consistent with disclosed embodiments.
Figure 31B:
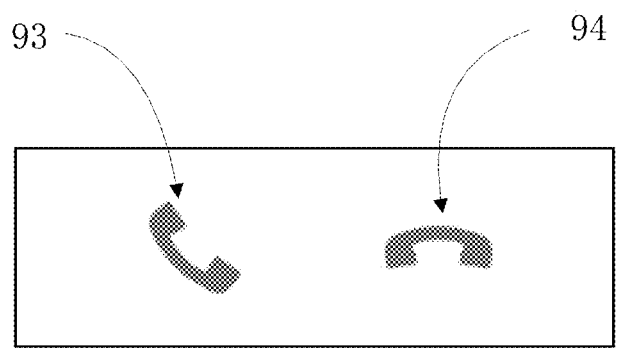
Figure 31C:
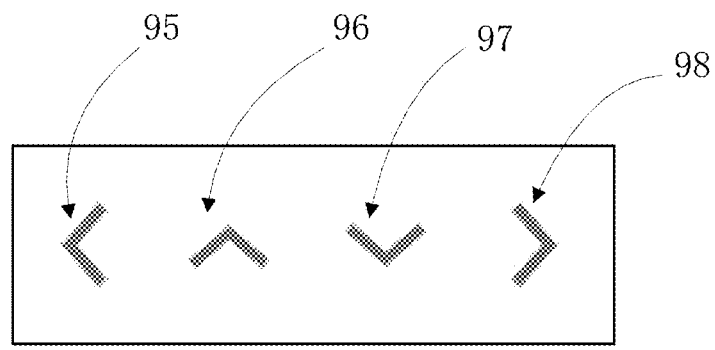

FIGS. 31a, 31b, and 31c show exemplary applications of controlling the electronic display device through the packaging box. Specifically, FIG. 31a shows a diagram of control information displayed on the packaging box for the electronic display device when playing back music. FIG. 31b a diagram of control information displayed on the packaging box for the electronic display device when receiving a call. FIG. 31c shows a diagram of control information displayed on the packaging box for the electronic display device when displaying a webpage.

As shown in FIG. 31a, when the electronic display device is playing back music, the electronic display device transmits to the packaging box information for controlling the music playback. After receiving the information for controlling the music playback, the packaging box generates corresponding icons to for controlling the music playback, and displays the control icons on the display screen of the packaging box. The display screen may be a touch screen. The icons may include a virtual key 91 for controlling play/pause of the music, and a virtual key 92 for fast forwarding to next music piece. When the user wants to pause the music playback, the user touches the virtual key 91. After receiving the control information inputted by the user, the packaging box sends the corresponding control instruction to control the electronic display device to pause the music playback. When the user wants to listen to the next song, similarly, the user touches the virtual key 92. After receiving the control information inputted by the user, the packaging box sends the corresponding control instruction to control the electronic display device to switch to the next music piece.

As shown in FIG. 31b, similarly, when the electronic display device is a mobile communication terminal, if the mobile communication terminal is called, the mobile communication terminal transmits the control information related to the call to the packaging box. After receiving the control information of the call, the packaging box generates virtual keys 93 and 94. The virtual key 93 is an answer key, and the virtual key 94 is a hang-up key. Based on actual needs, a user can touch a corresponding virtual key, and the packaging box sends corresponding control information to the electronic display device to answer the call or to hang up the call. Further, in addition to the virtual keys 93 and 94, the electronic display device can also send basic information of the caller, such as contact name, phone number, etc., to the packaging box. The packaging box can display the received basic information of the contact on the touch screen. Thus, when the user views from the packaging box the image displayed by the electronic display device, the user does not need to hurry to pick up the electronic display device to operate, increasing the user's convenience.

Similarly, as shown in FIG. 31c, when the user browses Internet news by a network connection through the electronic display device, the packaging box displays the webpage displayed by the electronic display device. The electronic display device sends the control information of the webpage to the packaging box. After receiving the control information of the webpage, the packaging box displays on the touch screen the corresponding virtual keys 95, 96, 97, and 98. The virtual key 95 is a 'Backward' key, the virtual key 96 is a 'UP' key, the virtual key 97 is a 'Down' key, and the virtual key 98 is a 'Forward' key. Using these virtual keys 95, 96, 97, and 98, the user can freely browse the webpage. Further, in addition to the virtual keys 95, 96, 97, and 98, the electronic display device can also send website information to the packaging box. The packaging box can display the received website information on the touch screen. The website information may include web address and website name, etc. The user can also enter website information on the touch screen on the packaging box to realize the equivalent effect of entering information on the electronic display device. For example, the touch screen can display a web address input field. When the user selects the input field, a virtual keyboard can pop-up for user input. Such webpage control method may bring a new experience for the users.

Figure 32:
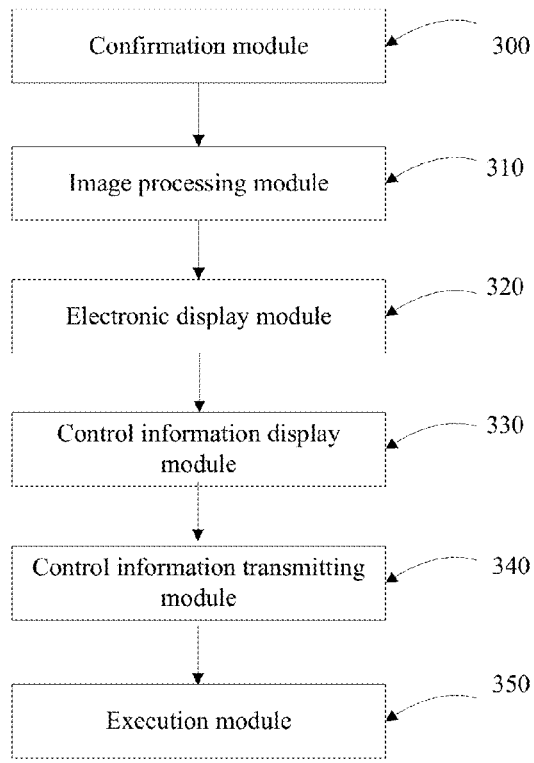
FIG. 32 illustrates a block diagram of an exemplary display system consistent with disclosed embodiments.

Further, as previously described, the disclosed embodiments also provide a display system. The display system includes a packaging box and an electronic display device. The electronic display device is placed inside the packaging box, and the packaging box can be used to display the image displayed by the electronic display device. FIG. 32 shows a block diagram of an exemplary display system.

As shown in FIG. 32, the display system may include an image processing module 310 and an electronic display module 320.

The image processing module 310 may be configured to process the image information to be displayed by the electronic display device. The electronic display module 320 may be configured to display on the packaging box the image displayed by the electronic display device.

In certain embodiments, the display system may also include a confirmation module 300. The confirmation module 300 may be coupled to the image processing module 310, and may be configured to confirm the electrical connection between the packaging box and the electronic display device.

Further, in certain embodiments, the display system may further include a control information display module 330 and a control information transmitting module 340. The control information display module 330 may be configured to display control information of the electronic display device on the packaging box, and the control information transmitting module 340 may be configured to transmit control information to the electronic display device.

The confirmation module 300 may be coupled to the image processing module 310, the image processing module 310 may be coupled to the electronic display module 320, the electronic display module 320 may be coupled to the control information display module 330, and the control information display module 330 may be coupled to the control information transmitting module 340.

Further, the display system may also include an execution module 350. The execution module 350 may be configured to perform corresponding actions according to the received control information. Execution module 350 may be coupled to the control information transmitting module 340.

It should be noted that, the image processing module 310, the electronic display module 320, the execution module 350 may be provided in the electronic display device, and the confirmation module 300, the control information display module 330, and the control information transmitting module 340 may be provided in the packaging box. Of course, other configurations can also be used.

Thus, by using the disclosed display system, the electronic display device can be controlled by the packaging box. The packaging box containing the electronic display device not only can display on the packaging box the image displayed by the electronic display device, but also control the electronic display device through the packaging box, bringing a new user experience. In addition, without direct manipulation of the electronic display device, reducing the chances when the user needs to open the packaging box or even damage the packaging box to access the electronic display device contained in the box body of the packaging box.

Figure 33:
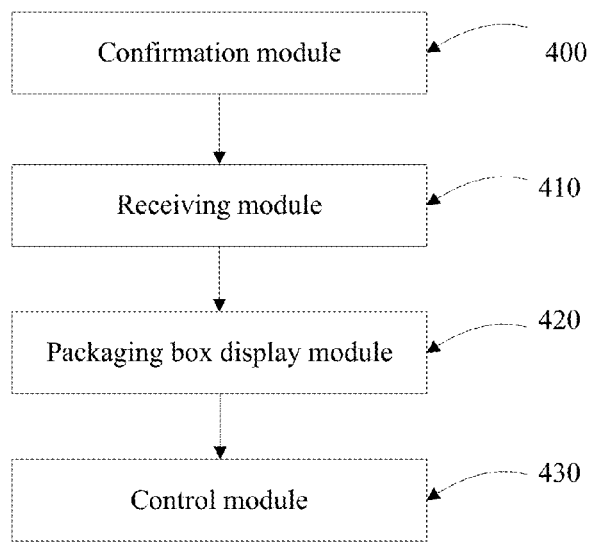
FIG. 33 illustrates a block diagram of another exemplary display system consistent with disclosed embodiments.

FIG. 33 shows a block diagram of another exemplary display system. As shown in FIG. 33, the display system may include a confirmation module 400, a receiving module 410, a packaging box display module 420, and a control module 430.

The confirmation module 400 may be provided for confirming that the electronic display device and the packaging box are connected electrically. The receiving module 410 may be provided for receiving an electric signal or message sent from the electronic display device. The received signal includes control information for controlling the electronic display device.

The packaging box display module 420 may be provided for displaying the control information for the electronic display device after receiving the signal sent from the electronic display device. The control module 430 may be provided for controlling the electronic display device according to the displayed control information for the electronic display device.

Further, in one embodiment, the display system may also include a display module (not shown) for displaying on the packaging box an image displayed by the electronic display device.

Further, in one embodiment, the display system may also include a placement state determining module (not shown) for determining the placement state of the electronic display device.

Further, in one embodiment, the display system may also include an identification module (not shown) for identifying the type of the electronic display device, and a download module (not shown) for downloading images matching the type of the electronic display device.

Further, in one embodiment, the display system may also include a display mode identification module, a position acquisition module, and a view image pixel combination module (not shown).

The display mode identification module may be provided for identifying whether the display mode of the electronic display device is in the 3D display mode. The position acquisition module may be provided for obtaining position information of the viewer when the display mode of the electronic display device is in the 3D display mode. Specifically, a tracking device installed on the packaging box can be used track the viewer and to determine the position of the viewer.

Further, the view image pixel combination module may be provided for rearranging or combining pixels of the left view image and the right view image by certain proportion. Specifically, after the position information of the viewer is determined, a current left view image with motion parallax relative to the previous left view image and a current right view image with motion parallax relative to the previous right view image are generated based on the position information, and the current left view image and the current right view image are combined into the 3D image.

Figure 34:
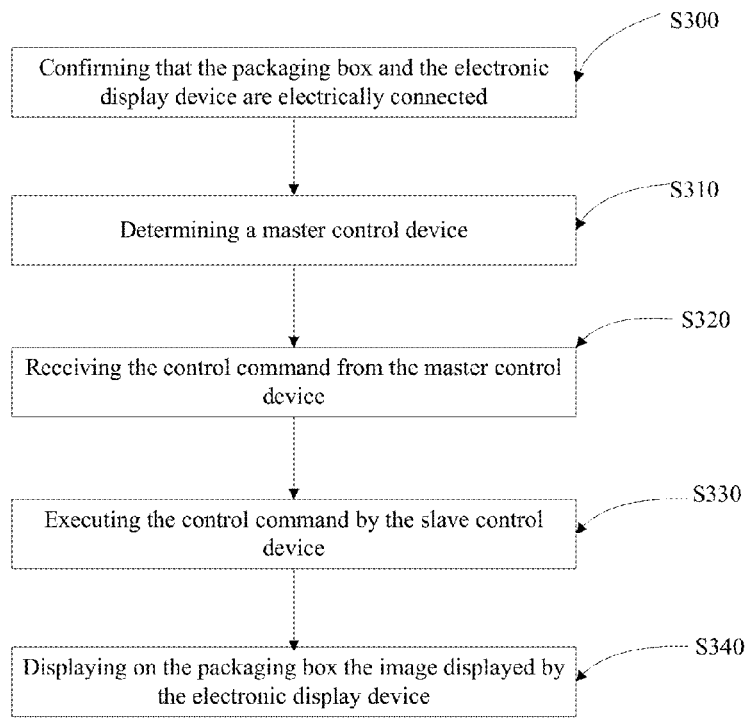
FIG. 34 illustrates an exemplary interactive control method for the display system consistent with disclosed embodiments.

FIG. 34 shows an exemplary interactive control method for the display system. As shown in FIG. 34, the interactive control method between a packaging box and an electronic display device may include the following steps.

Step S300, confirming that the packaging box and the electronic display device are electrically connected.

Step S310, determining a master control device. Based on the operating status of the packaging box and the electronic display device, one of the electronic display device and the packaging box can be determined as the master control device, and the other one can be determined as the slave control device.

The operating state may refer to application programs currently running on the electronic display device and the packaging box, and whether the electronic display device is in a sleep state, standby state, or wakeup state.

When it is determined that the electronic display device is running certain applications, such as movies, games, music or phone calls, etc., the packaging box may be determined as the master control device. When the electronic display device is entering into the sleep state, the standby state, or the wakeup state, the electronic display device can be determined as the master control device.

Step S320, receiving a control command, i.e., receiving the control command from the master control device.

Step S330, executing the control command by the slave control device. That is, the slave control device performs an operation corresponding to the control command. In other words, based on the control command received from the master control device, the slave control device performs the corresponding operation.

Step S340, optionally or additionally, displaying on the packaging box the image displayed by the electronic display device.

In certain embodiments, the master control device completely controls the slave control device, while which one of the packaging box and the electronic display device becomes the master control device or the slave control device is not fixed. Based on actual needs and certain preconfigured rules, one of the packaging box and the electronic display device is set as the master control device, and the other is set as the slave control device. Thus, it may be convenient for the user to operate, increasing the user experience.

In one embodiment, when the electronic display device is about to enter the standby state, the electronic display device is set as the master control device. Shortly before entering the standby state, a standby instruction is sent from the master control device to the slave control device, i.e., the packaging box. After receiving the standby instruction, the packaging box performs a standby operation immediately, such that the packaging box enters the standby state together with the electronic display device.

In one embodiment, when the electronic display device is playing music, the packaging box is set as the master control device. The user can issue control instructions through the packaging box to control the music playback, such as play, pause, or forward, etc.

In one embodiment, when the electronic display device is about to enter the sleep state, the electronic display device is set as the master control device. Shortly before entering the sleep state, a sleep instruction is sent from the master control device (the electronic display device) to the packaging box (slave control device). After receiving the sleep instruction, the packaging box performs a sleep operation immediately, such that the packaging box enters the sleep state together with the electronic display device.

In one embodiment, when the electronic display device enters a wakeup state from a sleep state, the electronic display device is set as the master control device. After the electronic display device enters into the wakeup state, it sends a wakeup command to the slave control device, the packaging box. After receiving the wakeup command, the packaging box performs a wakeup operation immediately, such that the packaging box can be in the wakeup state together with the electronic display device.

In certain other embodiments, the packaging box entering the sleep state, standby state, or wakeup state can be set as the master control device, and the electronic display device can be set as the slave control device. Thus, when the packaging box enters the sleep state, standby state, or wakeup state, the electronic display device can be synchronized into the sleep state, standby state, or wakeup state.

Further, the interactive control method may also include a display step, displaying on the packaging box the image displayed by the electronic display device. An image processing step may also be included before the display step, i.e., the image information to be displayed by the electronic display device is processed.

Further, in certain embodiments, a placement state determining step may be provided between Step S330 and Step S340 for determining the placement state of the electronic display device.

Specifically, it is determined whether the electronic display device is placed on the specified position of the packaging box, i.e., the placement state. When the electronic display device is placed on the specified position of the packaging box, i.e., the correct placement state, the image on the electronic display device can be displayed properly on the packaging box.

Further, if the electronic display device is not placed on the specified position of the packaging box, i.e., the incorrect placement state, an alert signal may be issued to alert the user to place the electronic display device on the specified location. The placement state can be determined by several ways, such as using a multi-axis gyroscope, using an orientation sensor, or using the USB interface module of the USB device on the packaging box.

When using the USB interface module of the USB device on the packaging box, after the electronic display device is placed in the packaging box, both the electronic display device and the packaging box are in working condition. The USB interface module of the USB device on the electronic display device are electrically connected to the USB interface module of the USB device on the packaging box, which means that the electronic display device is placed in the specified location.

Further, the interactive control method may further include the following steps (not shown).

An identification step, i.e., identifying the type of electronic display device. The type of electronic display device may include: a mobile communication terminal, a flat panel display, a PC, and a gaming device, etc. The installed operating system and/or image display device may also be included. After the electronic display device is placed in the packaging box, different types of electronic display device may require different image display formats, such as a 3D display format or a normal 2D image display format, and the display effect of the same image may be different for different types of electronic display devices. For example, for images suitable for display on a mobile communication terminal displays the image, the display effect may be different when the images are displayed on a game device having a different operating system.

A downloading step, i.e., downloading images matching the type of electronic display device. The electronic display device may be connected to the Internet through a wired or wireless connection, and may download an image matching the type of electronic display device from an application store. For example, when the mobile communication terminal with android operating system is connected to the Internet, it may automatically find the appropriate image of the mobile communication terminal, and download the image for display on the mobile communication terminal. Also for example, when the packaging box sends an instruction to the electronic display device for playing a movie, the electronic display device checks whether its storage module has the corresponding movie or download the movie from the Internet, and play the movie on the electronic display device. The images are then displayed on the packaging box.

Further, the disclosed interactive control method may also include the following steps.

A display mode determining step, i.e., determining whether the electronic display device is in a 3D display mode. When it is determined that the electronic display device is not in the 3D display mode, the method proceeds to Step S1. When the electronic display device is in the 3D display mode, the method further includes the followings.

A position acquisition step, i.e., acquiring position information of the viewer. Specifically, using a tracking device installed on the packaging box, the viewer is tracked and the position of the viewer is determined.

A 3D parallax image pixel mixing and arranging step, i.e., rearranging or combining pixels of the left view image and the right view image by certain proportion. Specifically, after the position information of the viewer is determined, a current left view image with motion parallax relative to the previous left view image and a current right view image with motion parallax relative to the previous right view image are generated based on the position information, and the current left view image and the current right view image are combined into the 3D image.

Figure 35:
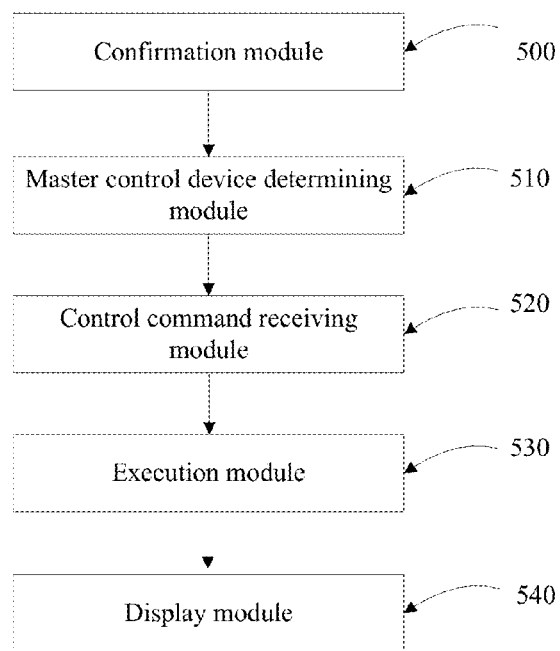
FIG. 35 illustrates an exemplary interactive control system consistent with disclosed embodiments.

The disclosed embodiments also provide an interactive control system. The interactive control system may include a packaging box and an electronic display device. The electronic display device can be placed in the packaging box and the packaging box can display images displayed by the electronic display device. FIG. 35 shows an exemplary interactive control system.

As shown in FIG. 35, the interactive control system may include a confirmation module 500, a master control device determining module 510, a control command receiving module 520, an execution module 530, and a display module 540. Other modules may also be included.

The confirmation module 500 may be provided for confirming that the packaging box and the electronic display device are connected electrically. The master control device determining module 510 may be provided for determining a master control device. Specifically, based on the operating status of the packaging box and the electronic display device, one of the electronic display device and the packaging box can be determined as the master control device, and the other one can be determined as the slave control device.

The operating state may refer to application programs currently running on the electronic display device and the packaging box, and whether the electronic display device is in a sleep state, standby state, or wakeup state.

When it is determined that the electronic display device is running certain applications, such as movies, games, music or phone calls, etc., the packaging box may be determined as the master control device. When the electronic display device is entering into the sleep state, the standby state, or the wakeup state, the electronic display device can be determined as the master control device.

The control command receiving module 520 may be provided for receiving control commands sent from the master control device. The execution module 530 is provided for performing the control command from the master control device. That is, according to the control command received by the slave control device, the execution module 530 performs the corresponding action. The display module 540 may be provided for displaying on the packaging box an image displayed by the electronic display device.

Further, in certain embodiments, the interactive control system may also include a placement state determining module, an identification module, a download module, a display mode identification module, a position acquisition module, and a 3D parallax image pixel mixing and arranging module (not shown).

The placement state determining module may be provided for determining the placement state of the electronic display device. The identification module may be provided for identifying the type of electronic display device. The download module may be provided for downloading images matching the type of electronic display device.

Further, the display mode identification module may be provided for determining whether the electronic display device is in a 3D display mode. The position acquisition module may be provided for acquiring position information of the viewer. Specifically, using a tracking device installed on the packaging box, the viewer is tracked and the position of the viewer is determined.

The 3D parallax image pixel mixing and arranging module may be provided for rearranging or combining pixels of the left view image and the right view image by certain proportion. Specifically, after the position information of the viewer is determined, a current left view image with motion parallax relative to the previous left view image and a current right view image with motion parallax relative to the previous right view image are generated based on the position information, and the current left view image and the current right view image are combined into the 3D image.

Thus, according to the disclosed interactive control system for the packaging box and the electronic display device, the master control device completely controls the slave control device, while which one of the packaging box and the electronic display device becomes the master control device or the slave control device is not fixed. Based on actual needs and certain preconfigured rules, one of the packaging box and the electronic display device is set as the master control device, and the other is set as the slave control device. Thus, it may be convenient for the user to operate, increasing the user experience.

The above-described embodiments are merely illustrative, and are not limiting. Those skilled in the art can understand that various modifications to these embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. Other applications, advantages, alternations, modifications, or equivalents to the disclosed embodiments are obvious to those skilled in the art.

What is claimed is:

1. An electronic packaging box, comprising:
   a receiving structure for receiving an electronic display device having a display screen for displaying an image by the electronic display device;
   a transmissive/reflective component spatially coupled to the receiving structure such that, when the electronic display device is placed on the receiving structure, the display screen of the electronic display device faces the transmissive/reflective component; and
   a support structure for supporting the receiving structure and the transmissive/reflective component,
   wherein the transmissive/reflective component forms a virtual image of the image displayed by the electronic display device placed in the receiving structure when viewed by a viewer at a viewing angle,
   the transmissive/reflective component has a first end and a second end in opposite to the first end, and the transmissive/reflective component permits certain light to pass through while reflecting certain other light,
   the receiving structure has a connecting end coupled to the first end of the transmissive/reflective component and a free end opposite to the connecting end, and
   the support structure is coupled to the second end of the transmissive/reflective component.

2. The electronic packaging box according to claim 1, wherein:
   the receiving structure includes a hollow frame configured to fit the electronic display device; and
   the support structure provides a space capable of containing accessories of the electronic display device.

3. The electronic packaging box according to claim 1, wherein:
   the support structure is movably coupled to the second end of the transmissive/reflective component by a movable connecting structure.

4. The electronic packaging box according to claim 3, wherein:
   the movable connecting structure allows the receiving structure and the transmissive/reflective component to extend from the supporting structure to form a certain angle between the display screen of the electronic display device placed in the receiving structure and the transmissive/reflective component.

5. The electronic packaging box according to claim 3, wherein:
   the support structure is a hollow rectangular box body;
   the receiving structure is parallel to the support structure; and
   the transmissive/reflective component forms two respective acute angles with the receiving structure and the support structure in a "Z" shape.

6. The electronic packaging box according to claim 3, wherein:
   the moveable connecting structure includes a positioning shaft having a positioning protrusion;
   the support structure includes a positioning sleeve having a corresponding positioning groove; and
   the positioning shaft is inserted into the positioning sleeve such that the positioning protrusion is engaged in the positioning groove for connecting the transmissive/reflective component with the support structure.

7. The electronic packaging box according to claim 1, wherein:
   the transmissive/reflective component includes a transmissive/reflective device having a surface coating whose transmissive/reflecting ratio is adjustable according to ambient light.

8. The electronic packaging box according to claim 5, wherein:
   the transmissive/reflective device is an electronically-controlled liquid crystal glass whose the transmissive/reflective ratio is adjusted by adjusting a voltage applied on the transmissive/reflective device based on changing ambient light.

9. The electronic packaging box according to claim 1, further including:
   a viewing angle adjusting mechanism disposed on the support structure to adjust the viewing angle.

10. The electronic packaging box according to claim 9, wherein:
    the support structure includes a first portion having a slider and a second portion having a groove matching the slider, and the first portion and the second portion are coupled together to form a box body by the slider and the groove, such that the first portion and the second portion form the viewing angle adjusting mechanism to adjust the viewing angle.

11. The electronic packaging box according to claim 1, wherein the support structure further includes:
    a power supply for supplying power to the electronic packaging box and the electronic display device;
    a pressing circuit switch coupled to the power supply to control power to the electronic display device;
    a communication interface unit for establishing a communication link between the electronic packaging box and the electronic display device; and
    a display screen for displaying information related to the electronic display device.

12. The electronic packaging box according to claim 11, wherein the communication interface unit further includes at least one of a USB interface module, a WIFI module, an NFC communication module, an RFID communication module, and a Bluetooth communication module.

13. The electronic packaging box according to claim 1, wherein:
    the receiving structure is fixedly coupled to the support structure and disposed in the support structure; and
    the support structure and the transmissive/reflective component are movably coupled together to allow the transmissive/reflective component to extend from the supporting structure to form a certain angle with the display screen of the electronic display device placed in the receiving structure.

14. The electronic packaging box according to claim 13, wherein:
    the certain angle is an acute angle in a range from 30 degrees to 60 degrees.

15. The electronic packaging box according to claim 1, wherein:

the support structure is a hollow box body.

16. The electronic packaging box according to claim 13, further including:

a reflector disposed in the support structure to reflect light from the display screen of the electronic display device to the transmissive/reflective component.

17. The electronic packaging box according to claim 1, wherein:

the receiving structure is fixedly coupled to the transmissive/reflective component such that the display screen of the electronic display device placed in the receiving structure and the transmissive/reflective component maintain a certain angle.

18. The electronic packaging box according to claim 17, wherein:

the transmissive/reflective component is moveably coupled to the support structure by a moveable connecting structure such that the receiving structure is placed inside the support structure.

19. The electronic packaging box according to claim 18, wherein:

the support structure is a hollow box body; and the transmissive/reflective component is configured to rotates along the support structure together with the receiving structure such that the transmissive/reflective component covers the support structure when in a close position and forms a certain angle between the transmissive/reflective component and the support structure when in an open position.

20. A display apparatus, comprising:

a first support structure arranged to receive an electronic display device having a display screen for displaying an image by the electronic display device;

a transmissive/reflective device disposed in a transmissive/reflective component coupled to the first support structure such that, when the electronic display device is placed on the first support structure, the display screen of the electronic display device faces the transmissive/reflective device; and a second support structure for supporting the first support structure and the transmissive/reflective device, wherein the transmissive/reflective device generates a virtual image of the image displayed by the electronic display device positioned on the first support structure after light of the image passing through the first support structure and being projected onto the transmissive/reflective device when viewed by a viewer at a viewing angle, the transmissive/reflective component has a first end and a second end in opposite to the first end, and the transmissive/reflective component permits certain light to pass through while reflecting certain other light, the first support structure has a connecting end coupled to the first end of the transmissive/reflective component and a free end opposite to the connecting end, and the second support structure is coupled to the second end of the transmissive/reflective component.

21. The display apparatus according to claim 20, wherein:

the transmissive/reflective device is an electronically-controlled liquid crystal glass whose the transmissive/reflective ratio is adjusted by adjusting a voltage applied on the transmissive/reflective device based on changing ambient light.

* * * * *